(12) United States Patent
Lindström

(10) Patent No.: US 12,114,047 B1
(45) Date of Patent: Oct. 8, 2024

(54) SKIPPING TO PLAYBACK POSITIONS IN MEDIA CONTENT USING SEEK GUIDES

(71) Applicant: Spotify AB, Stockholm (SE)

(72) Inventor: Erik Johan Curcio Lindström, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/456,157

(22) Filed: Aug. 25, 2023

(51) Int. Cl.
  *H04N 21/845* (2011.01)
  *H04N 21/472* (2011.01)

(52) U.S. Cl.
  CPC ... *H04N 21/47217* (2013.01); *H04N 21/8456* (2013.01)

(58) Field of Classification Search
  CPC .... G06F 16/739; G06F 16/735; G06F 16/745; G06F 16/7837; G06F 3/165; G06F 13/00; G06F 3/012; G06F 3/013; G06F 3/017; G06F 3/0483; G06F 3/0484; G06F 3/04847; G06F 3/0485; G06F 3/16; G06F 40/169; G06F 9/46; G06F 9/485; G06F 16/1748; G06F 16/178; G06F 16/1834; G06F 16/9554; G06F 16/958; G06F 21/10; G06F 30/13; G06F 30/20; H04N 1/00; H04N 3/00; H04N 5/00; H04N 9/00; H04N 11/00; H04N 13/00; H04N 2201/00; H04N 19/00; H04N 17/00; H04N 21/00; H04N 23/00; H04N 25/00; H04N 2101/00
  See application file for complete search history.

(56) References Cited

U.S. PATENT DOCUMENTS

| | | | |
|---|---|---|---|
| 9,479,836 B2 * | 10/2016 | Adimatyam | H04N 21/482 |
| 10,606,461 B1 | 3/2020 | Eldawy | |
| 2012/0174005 A1 | 7/2012 | Deutsch et al. | |
| 2013/0067332 A1 * | 3/2013 | Greenwood | G06F 3/0485 |
| | | | 715/720 |
| 2015/0350735 A1 * | 12/2015 | Köser | H04N 21/2743 |
| | | | 725/37 |
| 2016/0357382 A1 | 12/2016 | Metz et al. | |
| 2017/0169811 A1 | 6/2017 | Sabbavarapu et al. | |
| 2023/0054388 A1 * | 2/2023 | Lin | H04N 21/4312 |

OTHER PUBLICATIONS

Knight, Jon, "Skipping Intros, End Scenes & Other Annoying in-Video YouTube Distractions on Android", YouTube Vanced, located online: https://android.gadgethacks.com/how-to/skip-intros-end-screens-other-annoying-video-youtube-distractions-android-0331437/ , May 9, 2023, 7 pages.

* cited by examiner

*Primary Examiner* — Rayeez R Chowdhury

(74) *Attorney, Agent, or Firm* — Merchant & Gould P.C.

(57) ABSTRACT

Systems and methods for skipping to playback positions in media content using seek guides are provided. Seek guides may be associated with a media content item. Each seek guide may have a position and a radius. When a user skips to a reference position, a seek guide selector may select a seek guide to use in setting a new playback position. The seek guide selector may use a probabilistic distribution positioned based on the reference position to select a seek guide. Probabilities may be calculated for each seek guide using a cumulative distribution function, and the seek guides may be ranked based on the calculated probabilities. A seek guide may be selected based on the ranking, and a new playback position may be set based on the position of the selected seek guide.

20 Claims, 27 Drawing Sheets

SKIPPING TO PLAYBACK POSITIONS IN MEDIA CONTENT USING SEEK GUIDES

BACKGROUND

As users consume media content, they may wish to fast forward or rewind. In many applications, a user is provided with a button that allows the user to skip forwards or backwards by a predetermined time (e.g., 15 seconds). However, when users fast forward and rewind, they may skip to a part of the media content that is confusing or for which the users lack context. For example, a user may fast forward by 15 seconds, and the media content may resume in the middle of a word or a sentence, so the user may not understand the context of the full word/sentence.

SUMMARY

In general terms, this disclosure is directed to skipping to playback positions in media content using seek guides. In some embodiments, and by non-limiting example, when a user skips by a predetermined amount of time to a reference position, probabilities are calculated for seek guides using a probabilistic distribution positioned based on the reference position. The seek guides are ranked based on the calculated probabilities, and a seek guide is selected based on the ranking. The playback position is set based on the position of the seek guide.

In an aspect, a method for determining skip positions in media content items is provided. One or more seek guides are associated with a media content item. Each of the seek guides includes a position. A request is received from a user to adjust a playback position to a reference position in the media content item. The reference position is a predetermined time away from an initial playback position of the user. A probability is calculated for at least one of the one or more seek guides using a probabilistic distribution positioned based on the reference position. The at least one of the one or more seek guides are ranked based on the calculated probabilities, and a new playback position is set based on the ranking.

In another aspect, a system for determining skip positions in media content items is provided. The system comprises one or more processors and one or more computer-readable storage devices. The one or more computer-readable storage devices store data instructions that when executed by the one or more processors cause the system to associate one or more seek guides with a media content item, define two or more regions within the media content item, receive a request from a user to skip within the media content item, and set a new playback position based on an initial playback position and the two or more regions. Each of the one or more seek guides includes a position. The request to skip includes a direction to skip. If the initial playback position is within a first region of the two or more regions, setting the new playback position includes to calculate a probability for at least one of the one or more seek guides, rank the at least one of the one or more seek guides based on the calculated probabilities, select a seek guide from the one or more seek guides based on the ranking, and set the new playback position based on the position of the selected seek guide. The probabilities are calculated using a probabilistic distribution positioned based on a reference position. The reference position is a predetermined time away from the initial playback position in the direction to skip.

In another aspect, a non-transitory computer-readable medium is provided. The non-transitory computer-readable medium has data instruction stored thereon that, when executed by one or more processors, cause the one or more processors to associate one or more seek guides each including a position with a media content item, receive a request from a user to skip to a reference position in the media content item, select a seek guide from the one or more seek guides based, at least in part, on a probabilistic distribution positioned based on the reference position, and set a playback position based on the position of the selected seek guide.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
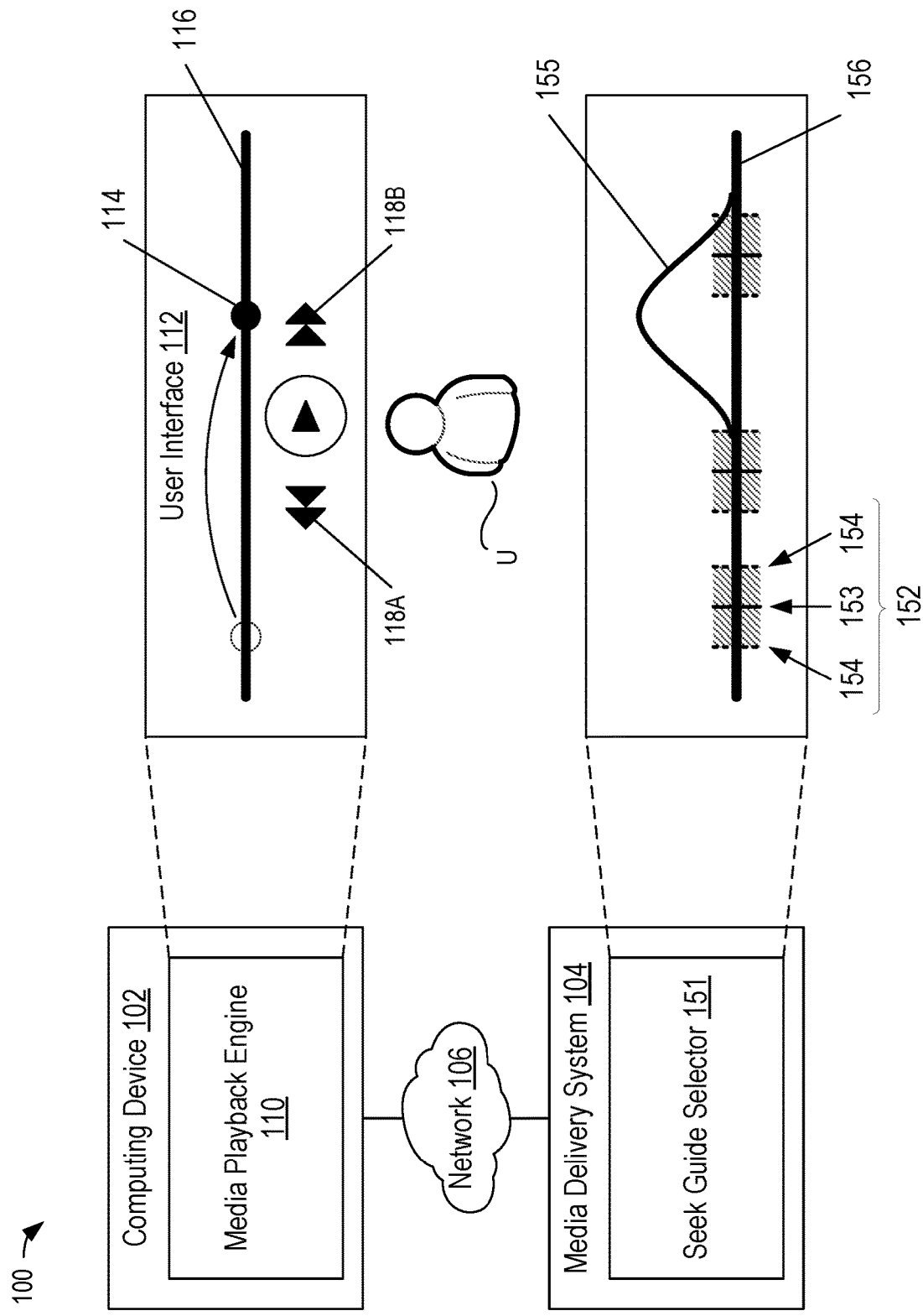
FIG. 1 illustrates a schematic block diagram of an example media playback system for skipping to playback positions based on seek guides.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As used herein, the term "including" as used herein should be read to mean "including, without limitation," "including but not limited to," or the like. The term "substantially" as used herein is a broad term and is to be given its ordinary and customary meaning to a person of ordinary skill in the art (and is not to be limited to a special or customized meaning), and furthermore refers without limitation to being largely but not necessarily wholly that which is specified.

As briefly described above, embodiments of the present disclosure are directed to skipping to playback positions in media content using seek guides. While examples described herein may refer to a specific form of media content—such as podcasts, audiobooks, or music tracks—the systems and methods described herein are applicable to any form of media content, including audio and video media content.

In example aspects, seek guides may be associated with a media content item. When a user requests to adjust a playback position to a reference position that is a predetermined time away from the playback position (e.g., 15 seconds), instead of resuming playback at the reference position, playback may instead resume at a position of a seek guide.

By resuming playback at the position of the seek guide rather than the position selected by the user, the user may avoid resuming playback at a position for which the user has no context or is confusing for the user. Playback may also resume at a position that is more interesting for the user. For example, seek guides may be associated with a podcast episode or an audiobook, and the seek guides may be positioned at the beginning of words and sentences. Seek guides associated with an audiobook may also be positioned at the beginning of paragraphs and chapters. In another example, seek guides may be associated with music tracks. In such examples, the seek guides may be positioned based on the lyrics, such as at the beginning of words and lines. The seek guides may also be positioned at the beginning of a verse, chorus, or hook.

Turning to FIG. 1, an example media playback system 100 for skipping to playback positions based on seek guides is shown. In the illustrated embodiment, the system 100 includes a user computing device 102 connected to a media delivery system 104 via a network 106.

The computing device 102 may be a media playback device. The computing device may include a media playback engine 110, which may be used to stream or otherwise play media content for a user U. The media playback engine 110 may include a user interface 112 that is presented on the computing device 102. The user interface may include a position indicator 114 on a scrub bar 116 as well as position controls 118. The position indicator 114 and the scrub bar 116 may define a playback position within a media content item being played through the media playback engine 110. The scrub bar 116 may represent a timeline 156 of the media content item within the media delivery system 104, and the position indicator 114 may indicate a current playback position within the media content item.

As the media content item is played through the media playback engine 110, the user U may wish to change the playback position within the media content item—i.e., the user U may wish to fast forward or rewind within the media content item. To change the playback position, the user U may use the position controls 118. For example, a first position control 118A may allow a user to rewind by setting a reference position a predetermined amount of time (e.g., 15 seconds) before the current playback position, and a second position control 118B may allow a user to fast forward by setting the reference position the predetermined amount of time after the current playback position. In some embodiments, the position controls 118 may each skip by different predetermined amounts of time—i.e., the first position control 118A may set the reference position 15 seconds away from the current playback position, and the second position control 118B may set the reference position 30 seconds away from the current playback position.

When the reference position is set by the position controls 118, a seek guide selector 151 in the media delivery system 104 may select a seek guide 152 to be the playback position. The seek guide selector 151 may maintain the timeline 156 representative of the media content item that includes one or more seek guides 152. Each seek guide may have a position 153 and a radius 154. The position 153 may be a time within the media content item, and the radius 154 may define a range of time around the position 153. For example, a seek guide 152 may have a position 153 of 10 seconds and a radius 154 of 2 seconds. The seek guide 152 may thus cover a range from 8 seconds to 12 seconds. Alternatively, the radius 154 may include two points in time that define a range of time around the position 153. For example, the seek guide 152 may have a position 153 of 10 seconds and a radius 154 that includes points at 8 seconds and 12 seconds to define a range from 8 to 12 seconds. In some embodiments, the points included in the radius 154 are not equidistant from the position 153—e.g., the position 153 may be at 10 seconds, and the radius 154 may include points at 8 seconds and 13 seconds to define a range from 8 seconds to 13 seconds.

Seek guides 152 may have positions 153 at points of interest within the media content item. For example, the positions 153 of seek guides 152 may be based on transcription data of the media content item—e.g., seek guides 152 may have positions 153 at the beginning of words, sentences, or paragraphs. This may be the case if the media content item associated with the seek guides is a podcast or an audiobook. The positions 153 of seek guides 152 may also be based on transcription data if the media content item is a music track; seek guides 152 may have positions 153 at the start of words in the lyrics. Additionally with music tracks, seek guides 152 may have positions 153 at the beginning of a verse, chorus, or hook. In an embodiment, the radius 154 of a seek guide 152 may also be based on transcription data, as described herein.

To select a seek guide 152, the seek guide selector 151 may create a probabilistic distribution 155 that is positioned based on the reference position set by the position controls 118. For example, the probabilistic distribution may have a mean at the reference position. Probabilities may then be calculated for each of the seek guides 152 using a cumulative distribution function. These probabilities may represent the probability that the position 153 of the seek guide 152 is the intended playback position for the user U. The seek guide selector 151 may select a seek guide 152 based on these probabilities—e.g., the seek guide selector 151 may select the seek guide 152 with the highest probability of being the intended playback position for the user U. The seek guide selector 151 may then set the playback position based on the position 153 of the selected seek guide 152. For example, the playback position may be set at the position 153 of the selected seek guide 152. In another example, the playback position may be set before the position 153 of the selected seek guide 152—e.g., one second before the position 153 of the seek guide 152.

By resuming playback at the position 153 of the selected seek guide 152 rather than at the reference position set by the position controls 118, playback may resume at a point of interest rather than resuming playback at the reference position which may be in the middle of an interesting portion of the media content item.

Figure 2:
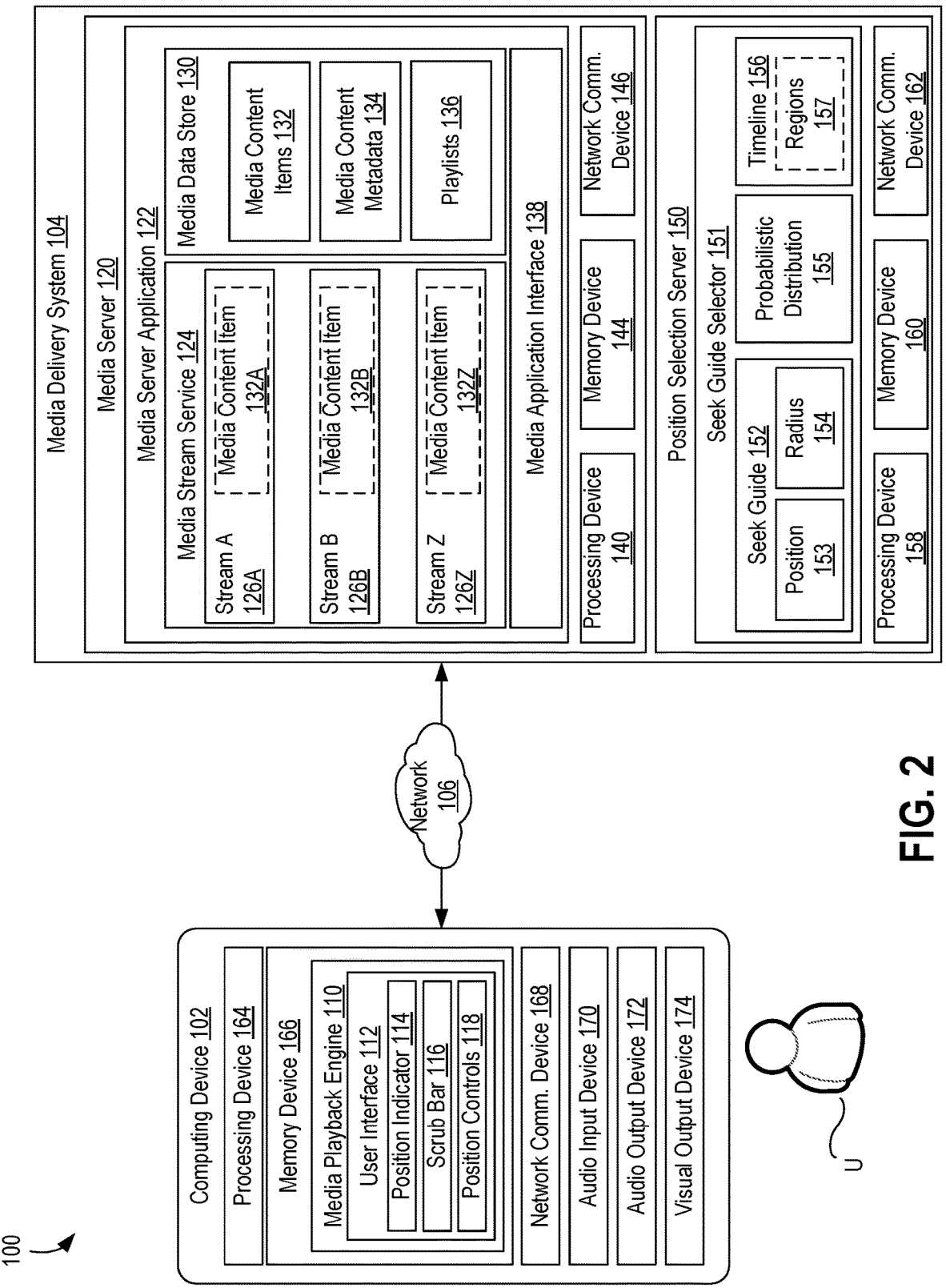
FIG. 2 illustrates a schematic block diagram of another example of a media playback system shown in FIG. 1.

FIG. 2 illustrates a schematic block diagram illustrating another example of the media playback system 100 shown in FIG. 1. In this example, the media playback system 100 includes the computing device 102 for a user U and the media delivery system 104. The network 106 is also shown for communication between the computing device 102 and the media delivery system 104.

As described herein, the computing device 102 operates to play media content items to a user U through the media playback engine 110. The computing device 102 may be, for example, a media playback device. In some embodiments, the computing device 102 operates to play media content items 132 that are provided (e.g., streamed, transmitted, etc.) by a system remote from the computing device 102 such as the media delivery system 104, another system, or a peer device. Alternatively, in some embodiments, the computing device 102 operates to play media content items stored locally on the computing device 102. Further, in at least some embodiments, the computing device 102 operates to play media content items that are stored locally as well as media content items provided by remote systems.

In some embodiments, the computing device 102 includes a processing device 164, a memory device 166, a network communication device 168, an audio input device 170, an audio output device 172, and a visual output device 174. In the illustrated example, the memory device 166 includes the media playback engine 110 which may display a user interface 112 to the user U with a position indicator 114, a scrub bar 116, and position controls 118. Other embodiments of the computing device 102 include additional, fewer, or different components. Examples of computing devices include a smartphone, a smart speaker, and a computer (e.g., desktop, laptop, tablet, etc.).

In some embodiments, the processing device 164 comprises one or more processing devices, such as central processing units (CPU). In other embodiments, the processing device 164 additionally or alternatively includes one or more digital signal processors, field-programmable gate arrays, or other electronic circuits. In some embodiments, the processing device 164 includes at least one processing device that can execute program instructions to cause the at least one processing device to perform one or more functions, methods, or steps as described herein.

The memory device 166 operates to store data and program instructions. In some embodiments, the memory device 166 stores program instructions for the media playback engine 110 that enables playback of media content items received from the media delivery system 104. As described herein, the media playback engine 110 is configured to communicate with the media delivery system 104 to receive one or more media content items—e.g., through the media content streams 126 (including media content streams 126A, 126B, and 126Z).

The memory device 166 includes at least one memory device. The memory device 166 typically includes at least some form of computer-readable media. Computer-readable media include any available media that can be accessed by the computing device 102. By way of example, computer-readable media can include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read-only memory, electrically erasable programmable read-only memory, flash memory and other memory technology, compact disc read-only memory, blue ray discs, digital versatile discs or other optical storage, magnetic cassettes, magnetic tape, magnetic disk storage or other magnetic storage devices, or any other medium that can be accessed by the computing device 102. In some embodiments, computer-readable storage media is non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The network communication device 168 is a device that operates to communicate data across the network 106. The network communication device 168 allows the computing device 102 to communicate with remote devices, such as with the media server 120 and the position selection server 150 of the media delivery system 104. Examples of the network communication device 168 include wired and wireless data communication devices, such as a cellular, WIFI, BLUETOOTH™, LoRa, and wired (e.g., Ethernet) communication device.

Some embodiments include an audio input device 170 that operates to receive audio input, such as voice input provided by the user. The audio input device 170 typically includes at least one microphone. In some embodiments, the audio input device 170 detects audio signals directly, and in other embodiments, the audio input device 170 communicates with another device that detects the audio signals (such as through a Bluetooth-connected microphone).

The audio output device 172 operates to output audible sounds, such as the media content and other audio outputs, such as audio cues. In some embodiments, the audio output device 172 generates media output to play media content to the user U. Examples of the audio output device 172 include a speaker, an audio output jack, and a Bluetooth transceiver (such as for communication with a Bluetooth-connected speaker). In some embodiments, the audio output device 172 generates an audio output directly, and in other embodiments, the audio output device 172 communicates with another device that generates the audio output. For example, the audio output device 172 may transmit a signal through an audio output jack or a Bluetooth transmitter that can be used to generate the audio signal by a connected or paired device such as headphones or a speaker.

Some embodiments also include a visual output device 174. The visual output device 174 includes one or more light-emitting devices that generate a visual output. Examples of the visual output device 174 include a display device (which can include a touch-sensitive display device) and lights such as one-or-more light-emitting diodes (LEDs). The visual output device 174 may operate to display the user interface 112 to the user U.

Still with reference to FIG. 2, the media delivery system 104 includes one or more computing devices, such as the media server 120 that provides media content items 132 to the computing device 102, and the position selection server 150 that selects seek guides 152 to which playback positions may be skipped. Each of the media server 120 and the position selection server 150 can include multiple computing devices in some embodiments. Although shown as separate servers, the media server 120 and the position selection server 150 may be the same server.

In some embodiments, the media delivery system 104 operates to transmit media content items 132 to one or more media playback devices such as the computing device 102.

In this example, the media server 120 comprises a media server application 122, a processing device 140, a memory device 144, and a network communication device 146. The processing device 140, memory device 144, and network communication device 146 may be similar to the processing device 164, memory device 166, and network communication device 168 respectively, which have been previously described.

In some embodiments, the media server application 122 operates to stream music or other audio, video, or other forms of media content. The media server application 122 includes a media stream service 124, a media data store 130, and a media application interface 138.

The media stream service 124 operates to buffer media content such as media content items 132 (including 132A, 132B, and 132Z) for streaming to one or more streams 126 (including 126A, 126B, and 126Z).

The media application interface 138 can receive requests or other communication from the media playback devices (such as the computing device 102) or other systems, to retrieve media content items from the media delivery system 104. For example, in FIG. 2, the media application interface 138 receives communications from the media playback engine 110 of the computing device 102.

In some embodiments, the media data store 130 stores media content items 132, media content metadata 134, and playlists 136. In some embodiments, the media data store 130 may also store information about seek guides 152. The media data store 130 may also store information about regions 157 of media content items 132. The media data store 130 may comprise one or more databases and file systems. Other embodiments are possible as well. As noted above, the media content items 132 may be audio, video, or any other type of media content, or a combination of any type of media content items, which may be stored in any format for storing media content. For example, media content items 132 may be music tracks, audiobooks, podcasts, advertisements, or any other form of media content.

The media content metadata 134 operates to provide information associated with the media content items 132. In some embodiments, the media content metadata 134 includes one or more of title, artist, lyrics, album name, length, genre, mood, era, captions, or other media metadata.

Information about seek guides 152 may be stored with other media content metadata 134. The information about seek guides 152 may be associated with a media content item 132. Seek guides 152 may be stored as a list. As described herein, seek guides 152 may be assigned to layers. In such embodiments, each layer of seek guides 152 may be stored as a list of positions 153. Because each seek guide 152 in a layer may have the same radius 154, a single value may be stored with the list of positions 153 to represent the radii 154 for each seek guide 152 in that layer. Information about regions 157 may similarly be stored with other media content metadata 134. The information about regions 157 may be stored as start and end times for the regions 157 within the associated media content items 132.

The playlists 136 operate to identify one or more of the media content items 132. In some embodiments, the playlists 136 identify a group of the media content items 132 in a particular order. In other embodiments, the playlists 136 merely identify a group of the media content items 132 without specifying a particular order. Some, but not necessarily all, of the media content items 132 included in a particular one of the playlist 136 are associated with a common characteristic such as a common genre, mood, or era.

In this example, the position selection server 150 includes a seek guide selector 151 with seek guides 152, a probabilistic distribution 155, a timeline 156, a processing device 158, a memory device 160, and a network communication device 162. In some embodiments, as further described herein, the timeline 156 may also include defined regions 157 for an associated media content item 132. Each seek guide 152 may have a position 153 and a radius 154. In some embodiments, the position selection server 150 maintains information about the seek guides 152. Alternatively, as described above, information about the seek guides 152 and regions 157 may be stored in the media data store 130. Information about the seek guides 152 and regions 157 may be associated with a media content item 132.

In some embodiments, any one or more of the functions, methods, and operations described herein as being performed by the position selection server 150—or components of the position selection server 150, such as the seek guide selector 151—can alternatively be performed by the media playback engine 110. This may include embodiments where the media delivery system 104 does not include a position selection server 150 and embodiments where the position selection server 150 cooperates with the media playback engine 110 and the functions are split between those components.

Components of the position selection server 150 can operate on a single computing device, or by cooperation of multiple computing devices. For example, the seek guide selector 151 can operate solely on the computing device 102 or solely on the position selection server 150. Alternatively, portions of components of the position selection server 150 can be performed by one or more other computing devices, such as by data communication between the computing device 102 and the media delivery system 104.

The processing device 158, memory device 160, and network communication device 162 may be similar to the processing device 164, memory device 166, and network communication device 168 respectively, which have each been previously described.

In various embodiments, the network 106 includes one or more data communication links, which may include multiple different types. For example, the network 106, can include wired and/or wireless links, including BLUETOOTH™, ultra-wideband (UWB), 802.11, ZigBee, cellular, LoRa, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

Figure 3:
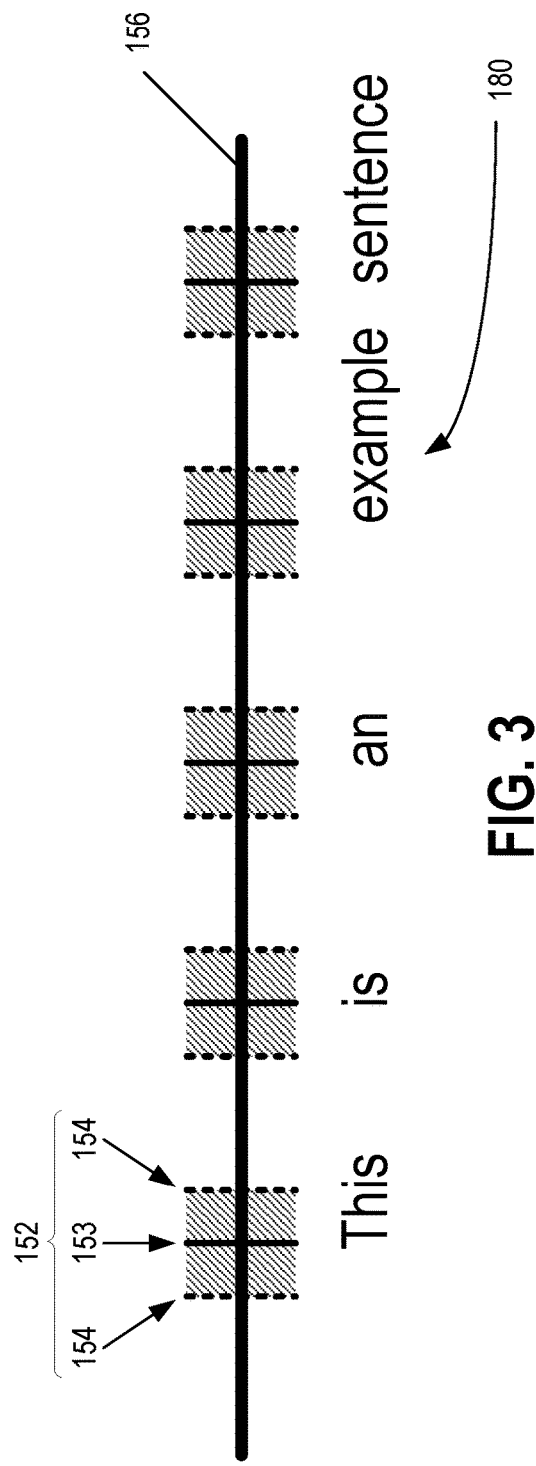
FIG. 3 illustrates an example of seek guides associated with a media content item.
Figure 4:
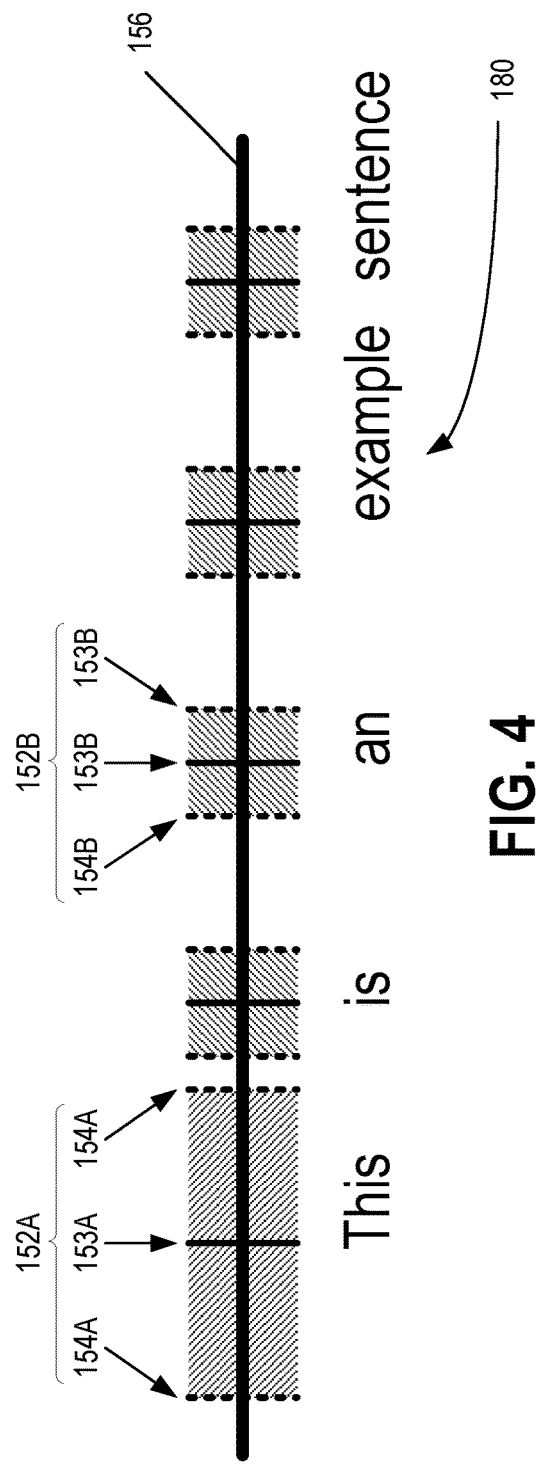
FIG. 4 illustrates a second example of seek guides associated with a media content item.

FIGS. 3 and 4 illustrate examples of seek guides 152 on a timeline 156 of a media content item. In the illustrated examples, seek guides 152 are positioned on the timeline 156 based on media content metadata (such as the media content metadata 134 maintained by the media delivery system 104 shown in FIG. 2), which in the illustrated examples is transcription data 180 for the media content item. The transcription data 180 may be, for example, a transcript of a podcast or an audiobook or lyrics of a music track. Each seek guide 152 has a position 153. In the illustrated embodiment, each position 153 is at the beginning of a word or sentence in the transcription data 180.

Each seek guide also has a radius 154. As described herein, the radius 154 may act as a weight for the seek guides 152, with a seek guide 152 with a larger radius 154 being more likely to be selected to be the playback position. As is shown in FIG. 3, the radius 154 of each seek guide 152 is the same. Because each seek guide 152 in FIG. 3 has the same radius 154, each seek guide 152 may be as likely to be selected when selecting a playback position. In contrast, in FIG. 4, a first seek guide 152A has a larger radius 154A than a second seek guide 152B. Because the first seek guide 152A has a larger radius 154A than the second seek guide 152B, the first seek guide 152A may be more likely to be selected when selecting a playback position than the second seek guide 152B.

The radius 154 may be based on a layer to which the seek guide 152 was assigned, with different layers having a different value for the radius 154. For example, if the seek guides 152 are positioned at the beginning of words and sentences, the seek guides 152 may be assigned between two layers: a first layer for seek guides 152 with a position 153 at the beginning of a sentence and a second layer for seek guides 152 with a position 153 at the beginning of a word. In the example illustrated in FIG. 4, the first seek guide 152A may be assigned to the first layer because it has a position 153A at the beginning of a sentence in the transcription data 180. The second seek guide 152B may be assigned to the second layer because it has a position 153B at the beginning of a word that is not the beginning of the sentence.

In an embodiment, the seek guides 152 may be manually associated with the media content item, such as by an administrator of a media delivery system manually setting the positions 153 and radii 154. In an alternative embodiment, the seek guides 152 may automatically be associated with the media content item, such as by automatically setting the positions 153 and radii 154 using the transcription data 180. For example, if the transcription data 180 includes a transcript or lyrics for the media content item and data mapping the transcript or lyrics to times in the media content item—e.g., forced alignment data—positions 153 may automatically be set at the beginning of words and sentences, and radii 154 may automatically be set to different values based on whether the seek guide 152 is positioned at the beginning of a word or a sentence. Automatically setting the radii 154 may include assigning the seek guides 152 to layers based on the transcription data 180—e.g., assigning seek guides 152 at the beginning of a sentence to a first layer and seek guides at the beginning of a word to a second layer—and then setting the radii 154 based on a layer to which the seek guide 152 is assigned. Alternatively, the radii 154 may automatically be set to a uniform value for all seek guides 152.

FIGS. 5-10 illustrate examples of skipping to a new playback position using seek guides. A user may wish to change a playback position in a media content item. The user may be at an initial playback position 202 in the media content item, as indicated by a position indicator 114 on a scrub bar 116 in a user interface 112. To change the playback position, the user may select a position control 118 in the user interface 112 to set a reference position 204. The reference position 204 may be a predetermined time away from the initial playback position 202 (e.g., 15 seconds). In the illustrated example, the user may select a second position control 118B to set the reference position 204 the predetermined time after the initial playback position 202. In alternative embodiments, the user may similarly use a first position control 118A, which may set the reference position 204 a predetermined time before the initial playback position 202. In embodiments, such as the embodiment depicted in FIG. 6, an end or beginning of the media content item may be less than the predetermined time away from the initial playback position 202. In such examples, the reference position 204 may be set at the end/beginning of the media content item.

After the reference position 204 is set, a seek guide selector 151 may select a seek guide 152 to use in setting a new playback position 206. As described above, the seek guides 152 have a position 153 and a radius 154 and are positioned on a timeline 156 of the media content item. The seek guide selector 151 may select a seek guide using a probabilistic distribution 155. The probabilistic distribution 155 may represent the probability that a position is the position the user intended to set as the new playback position 206.

The probabilistic distribution 155 may be positioned based on the reference position 204 set by the user. In the illustrated embodiments of FIGS. 5-7 and 9-10, the probabilistic distribution 155 may be a normal distribution. In alternative embodiments, other types of probabilistic distributions may be used. For example, such as in the embodiment depicted in FIG. 8, the probabilistic distribution 155 may be a skewed distribution. Other types of probabilistic distributions may be used as well, including exponential distributions and bimodal distributions. As in the illustrated embodiments, the probabilistic distribution 155 may have a mean at the reference position 204. In alternative embodiments, the probabilistic distribution 155 may be positioned based on the reference position 204 in alternative manners. For example, the probabilistic distribution 155 may be positioned such that the probabilistic distribution 155 has a median or a mode at the reference position 204. The probabilistic distribution 155 may also have a standard deviation. In an embodiment, the standard deviation of the probabilistic distribution 155 may be set manually by an administrator.

The probabilistic distribution 155 may be used to calculate a probability for each seek guide 152. The probabilities calculated for each seek guide 152 may represent the probability that the position 153 of the seek guide 152 is the playback position intended by the user. The probabilities may be calculated using a cumulative distribution function of the probabilistic distribution 155. The cumulative distribution function may define the probability for a seek guide 152 that the intended playback position is within one radius 154 of the position 153. In an example, the probabilities are calculated using the following equation, where pp represents the probability, Ix represents the cumulative distribution function, p represents the position 153 of the seek guide 152, and r represents the radius 154 of the seek guide 152:

$$p_\rho = F_x(\rho+r) - F_x(\rho-r) \quad \quad 1)$$

In alternative embodiments, a probability may be calculated for only a subset of the seek guides 152. For example, the seek guide selector 151 may only calculate probabilities for a predetermined number of seek guides 152 based on a distance from the reference position 204 to the positions 153 of the seek guides 152—e.g., probabilities may be calculated for seek guides 152 that have positions 153 among the 10 closest positions 153 to the reference position 204. In another example, the seek guide selector 151 may calculate probabilities only for seek guides 152 that have positions 153 within a predetermined distance of the reference position—e.g., the seek guide selector 151 may only calculate probabilities for seek guides 152 that have positions 153 within 5 seconds of the reference position 204. In a further example, the seek guide selector 151 may only calculate probabilities for one seek guide 152 in each layer—e.g., the seek guide selector 151 may calculate probabilities for the seek guides 152 that have positions 153 that are the closest to the reference position 204 in each layer.

In the illustrated embodiments of FIGS. 5-10, the calculated probabilities for each seek guide 152 are represented by shaded regions between the probabilistic distribution 155 and the timeline 156. A larger shaded area indicates a higher probability that the position 153 of the seek guide 152 associated with the shaded area is the intended playback position.

The seek guide selector 151 may select the seek guide 152 for setting the new playback position 206 based on the calculated probabilities. For example, the seek guide selector 151 may rank the seek guides 152 based on the calculated probabilities, and then select the seek guide 152 that had the highest ranking—i.e., the seek guide selector 151 may select the seek guide 152 that had the highest probability. If the calculated probabilities for multiple seek guides 152 are the same and those seek guides 152 are tied in the ranking, the seek guide selector 151 may use tiebreakers to select a seek guide from among the tied seek guides 152. For example, the seek guide selector 151 may select the seek guide 152 with a position 153 that is closest to the reference position 204 as the tiebreaker. In an alternative example, the seek guide selector 151 may select the seek guide 152 that has the largest radius 154 as the tiebreaker. In another alternative example, the seek guide selector 151 may select the seek guide 152 with a position 153 that is earliest on the timeline 156 as the tiebreaker. In another alternative example, the seek guide selector 153 may randomly select a seek guide 152 as the tiebreaker.

Figure 5:
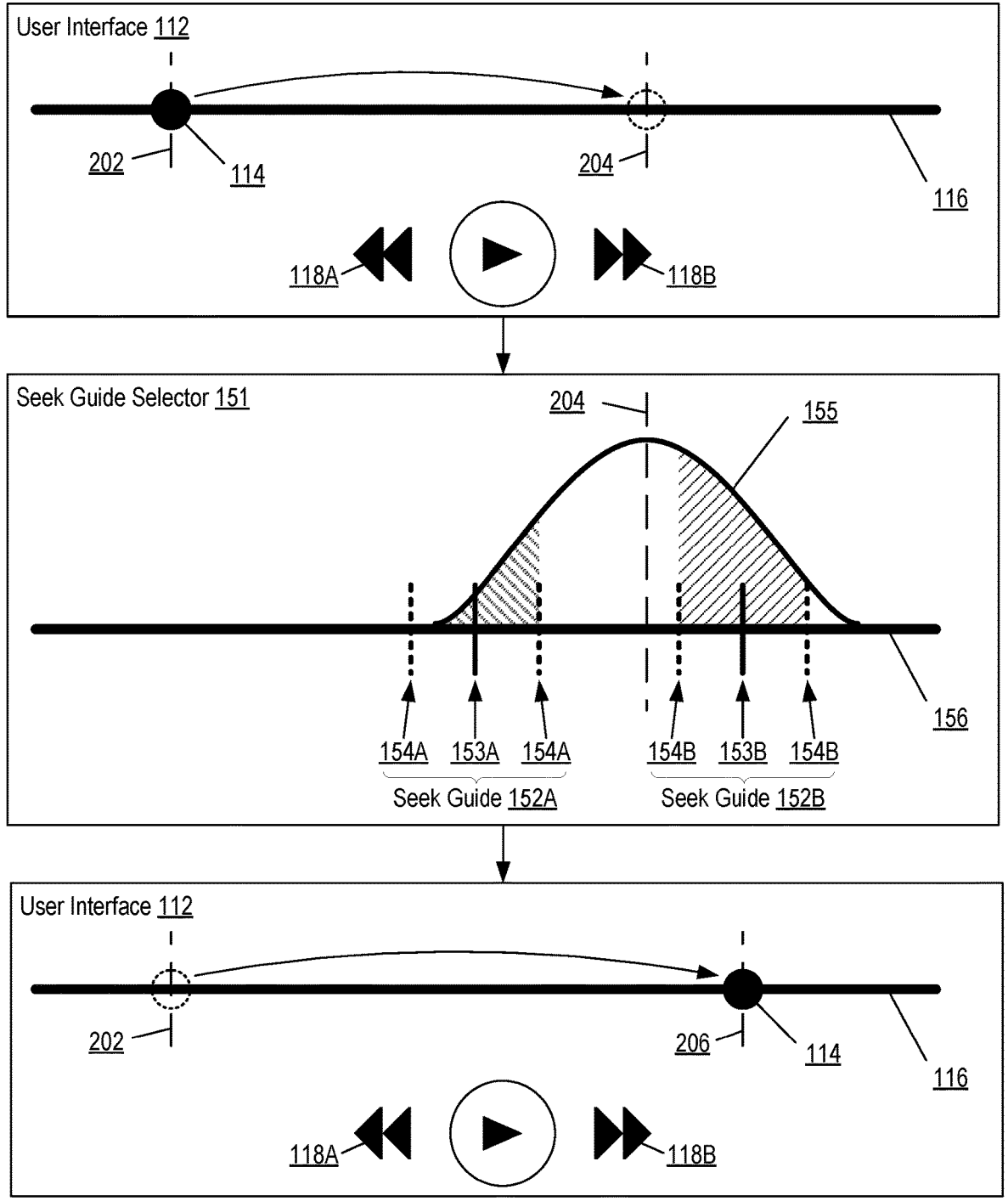
FIG. 5 illustrates an example of skipping to a playback position using seek guides.
Figure 6:
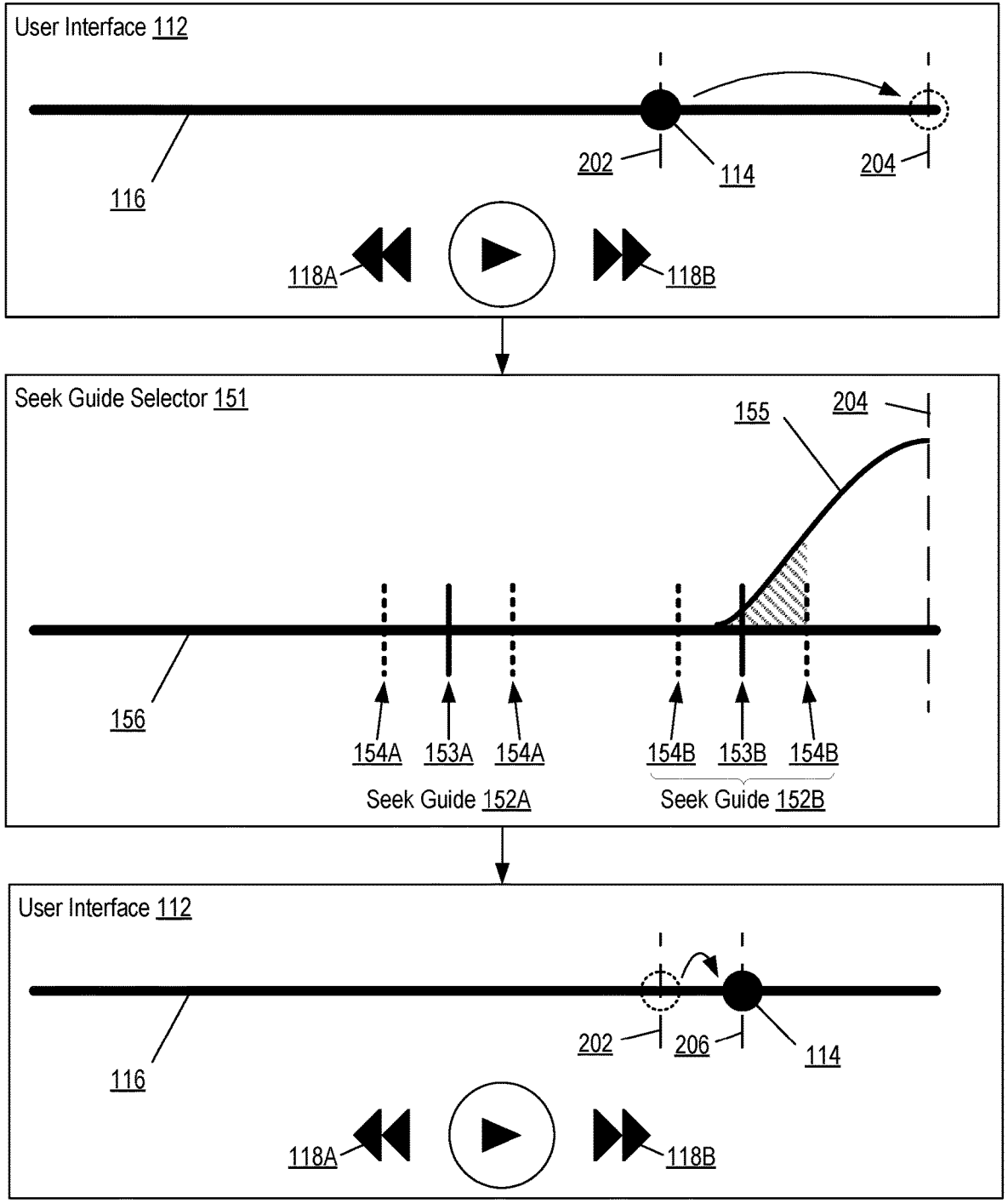
FIG. 6 illustrates a second example of skipping to a playback position using seek guides.

In the embodiments depicted in FIGS. 5 and 6, the seek guide selector 151 may choose between a first seek guide 152A and a second seek guide 152B. In the illustrated example, the seek guide selector 151 may select the second seek guide 152B. As indicated by the shaded areas between the probabilistic distribution 155 and the timeline 156, the second seek guide 152B has a higher calculated probability than the first seek guide 152A, so the second seek guide 152B may be ranked higher than the first seek guide 152A by the seek guide selector 151. While the second seek guide 152B has a position 153B that is closer to the reference position 204 than the first seek guide 152A, the seek guide selector 151 selects a seek guide 152 based on the ranking of the calculated probabilities, not distances from the positions 153 to the reference position 204—unless distance from the positions 153 to the reference position 204 is being used as a tiebreaker, as described above.

Figure 7:
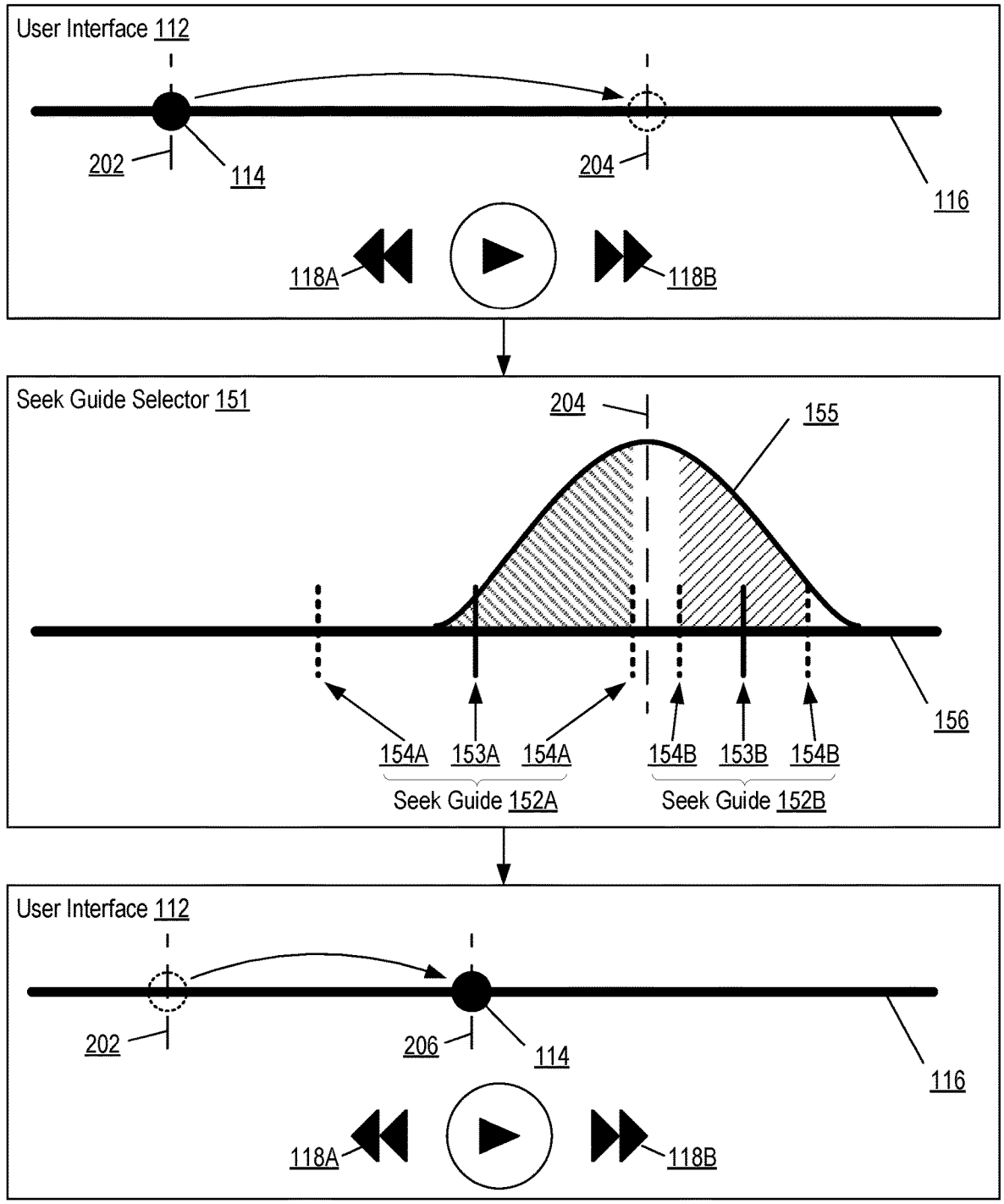
FIG. 7 illustrates a third example of skipping to a playback position using seek guides.
Figure 8:
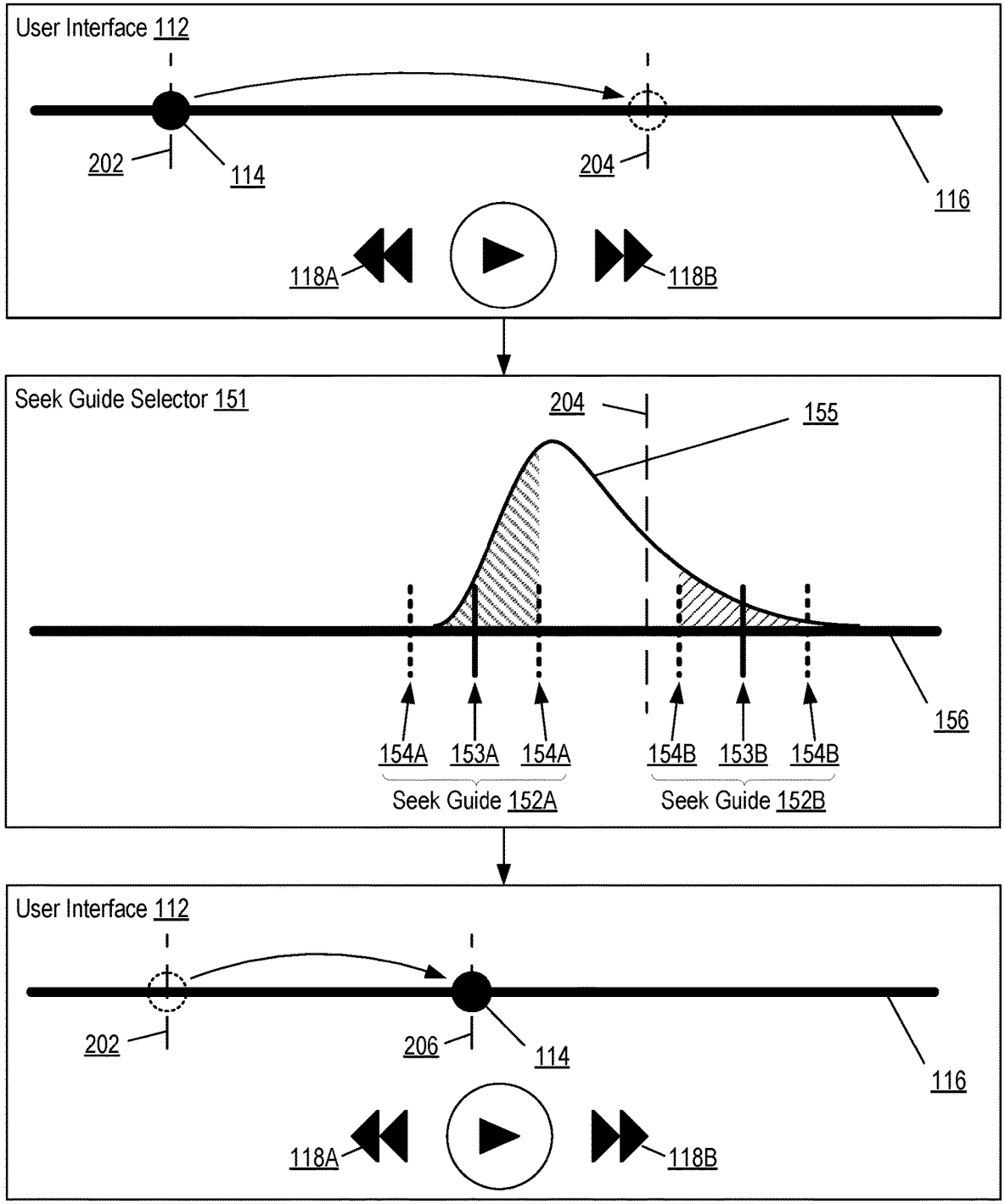
FIG. 8 illustrates a fourth example of skipping to a playback position using seek guides.

FIGS. 7 and 8 illustrate examples in which the seek guide selector 151 may select the first seek guide 152A that has a position 153A that is not the closest to the reference position 204. In the example depicted in FIG. 7, the radius 154A of the first seek guide 152A may be larger than the radius 154B of the second seek guide 152B. This may be because the first seek guide 152A is assigned to a different layer than the second seek guide 152B. For example, the first seek guide 152A may have a position 153A at the beginning of a sentence whereas the second seek guide 153B may have a position 153B at the beginning of a word, and layers may be assigned accordingly. Because the first seek guide 152A has a large radius 154A, the calculated probability using the cumulative distribution function of the probabilistic distribution 155 is higher than if the radius 154A was small—such as with the first seek guide 152A as depicted in FIG. 5. As described previously, the calculated probabilities for the seek guides 152 are indicated in illustrated embodiments by the shaded regions between the probabilistic distribution 155 and the timeline 156. Even though the first seek guide 152A has a position 153A that is farther away from the reference position 204 than the position 153B of the second seek guide 152B, the first seek guide 152A may still be selected by the seek guide selector 151 because the first seek guide 152A has a higher calculated probability of being the intended playback position and may therefore be ranked higher.

In the example depicted in FIG. 8, the probabilistic distribution 155 is a skewed distribution. In the illustrated embodiment, the probabilistic distribution 155 is right-skewed, but the probabilistic distribution 155 is still positioned to have a mean at the reference position 204. Thus, the probabilistic distribution has a mode to the left side of the reference position 204. A right-skewed probabilistic distribution 155 may be used to increase the likelihood that a seek guide 152 with a position 153 to the left of the reference position 204 is selected by the seek guide selector 151. This may be beneficial to increase user context when listening to and/or watching the media content item. By increasing the likelihood that a seek guide 152 with a position 153 to the left of the reference position 204 is selected by the seek guide selector 151, the new playback position 206 is more likely to be set earlier in the media content item, allowing the user to hear/see more of the media content item.

With the skewed probabilistic distribution 155, the calculated probability for the first seek guide 152A may be higher than the calculated probability for the second seek guide 152B, even though the second seek guide 152B has a position 153B closer to the reference position 204 than the position 153A of the first seek guide 152A. Accordingly, the seek guide selector 151 may rank the first seek guide 152A higher, and may select the first seek guide 152A to use in setting the new playback position 206.

By ranking, and ultimately selecting, based on the calculated probabilities rather than distances to the reference position 204, the seek guide selector 151 may select more optimal seek guides 152 to use for setting the new playback position 206 than if only distance to the reference position 204 were considered. For example, like in FIG. 7, the second seek guide 152B with a position 153B closest to the reference position 204 may be at the beginning of the second word of a sentence, and the first seek guide 152A that has a position 153A further away from the reference position 204 may be at the beginning of the sentence. By using the probabilistic distribution 155 to select the seek guide 152, the more optimal seek guide 152A may be selected, and the user may hear the entire sentence, rather than only hearing from the second word onward.

The seek guide selector 151 may also consider a direction to skip when selecting a seek guide 152. For example, if the user selects the second position control 118B to fast forward, the direction to skip may be forward, and the seek guide selector 151 may only select seek guides 152 that have a position 153 to the right of the initial playback position 202 on the timeline 156. Similarly, if the user selects the first position control 118A to rewind, the direction to skip may be backward and the seek guide selector 151 may only select seek guides 152 that have a position 153 to the left of the initial playback position 202 on the timeline 156. By considering the direction to skip, the seek guide selector 151 may avoid selecting a seek guide 152 with a position 153 that when used as the new playback position 206 causes the user to rewind when the user requested to fast forward, or vice versa.

Figure 9:
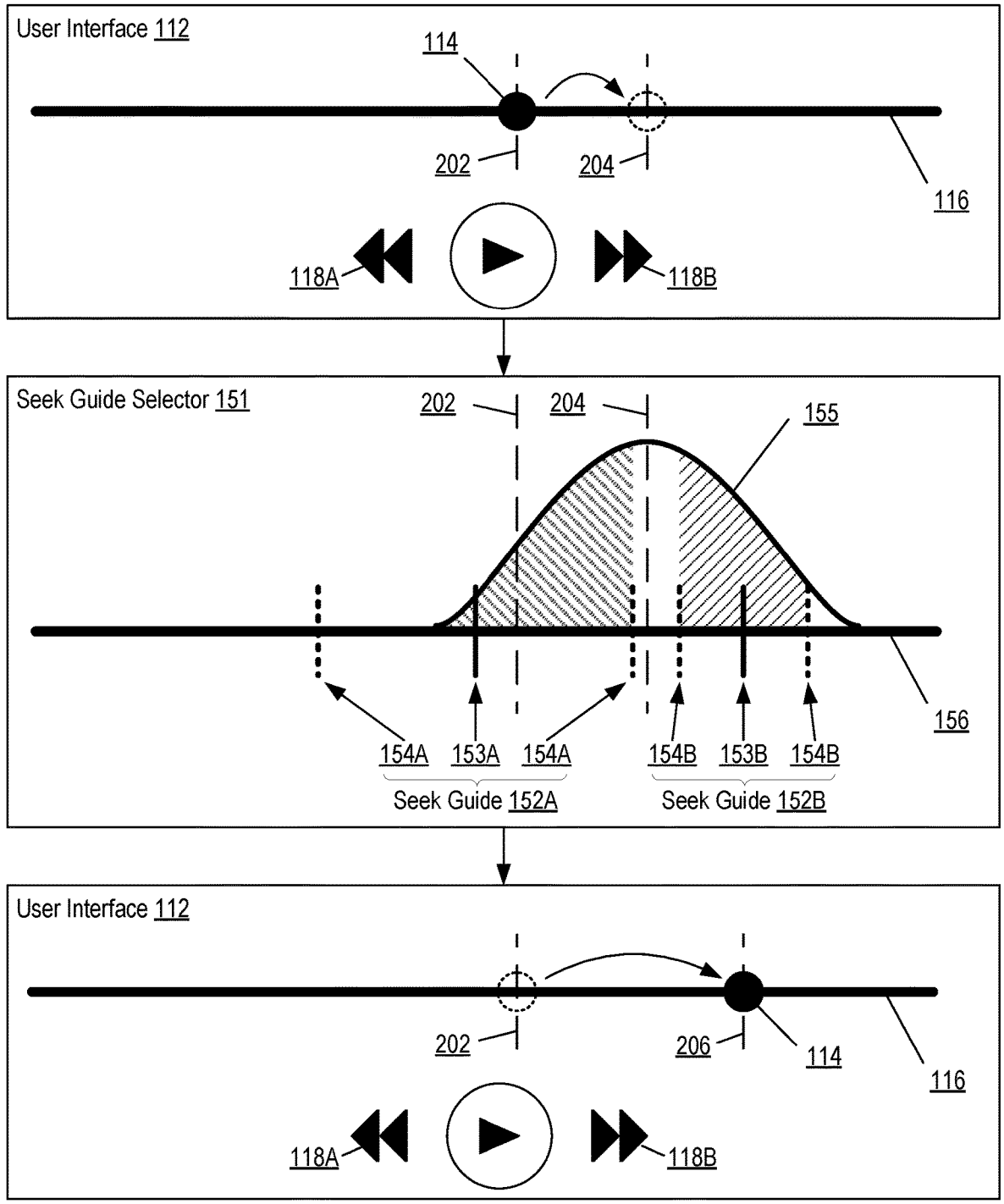
FIG. 9 illustrates a fifth example of skipping to a playback position using seek guides.

In the example embodiment depicted in FIG. 9, the seek guide selector 151 may select the second guide 152B even though the first seek guide 152A has a higher calculated probability. In this example, the user selected the second position control 118B to fast forward, so the seek guide selector 151 may only select a seek guide 152 with a position 153 to the right of the initial playback position 202 on the timeline 156. Even though the calculated probability for the first seek guide 152A is the highest, the seek guide selector 151 may ignore the first seek guide 152A because its position 153A is to the left of the initial playback position 202, so selection of the first seek guide 152A may cause the user to rewind when the user requested to fast forward. Therefore, the seek guide selector 151 may select the second seek guide 152B to use in setting the new playback position 206 because the second seek guide 152B has the highest calculated probability of the seek guides 152 with a position 153 to the right of the initial playback position 202.

In some embodiments where the seek guide selector 151 considers the direction to skip, the seek guide selector 151 may not calculate probabilities and/or rank seek guides 152 that have a position 153 that does not align with the direction to skip.

Once the seek guide selector 151 selects a seek guide 152, the seek guide selector 151 may set the new playback position 206 based on the position 153 of the selected seek guide 152. For example, the new playback position 206 may be set substantially at the position 153 of the selected seek guide 152. In another example, the new playback position 206 may be set before the position 153 of the selected seek guide 152—e.g., one second before the position 153. In an embodiment, the seek guide selector 151 works with another component, such as the media stream service 124 or the media playback engine 110 shown in FIG. 2 to set the new playback position 206.

The user interface 112 may be updated based on the new playback position 206 set by the seek guide selector 151. The position indicator 114 may move along the scrub bar 116 from the initial playback position 202 to the new playback position 206, which may match the position 153 of the selected seek guide 152. Playback of the media content item may then continue from the new playback position 206.

Figure 10:
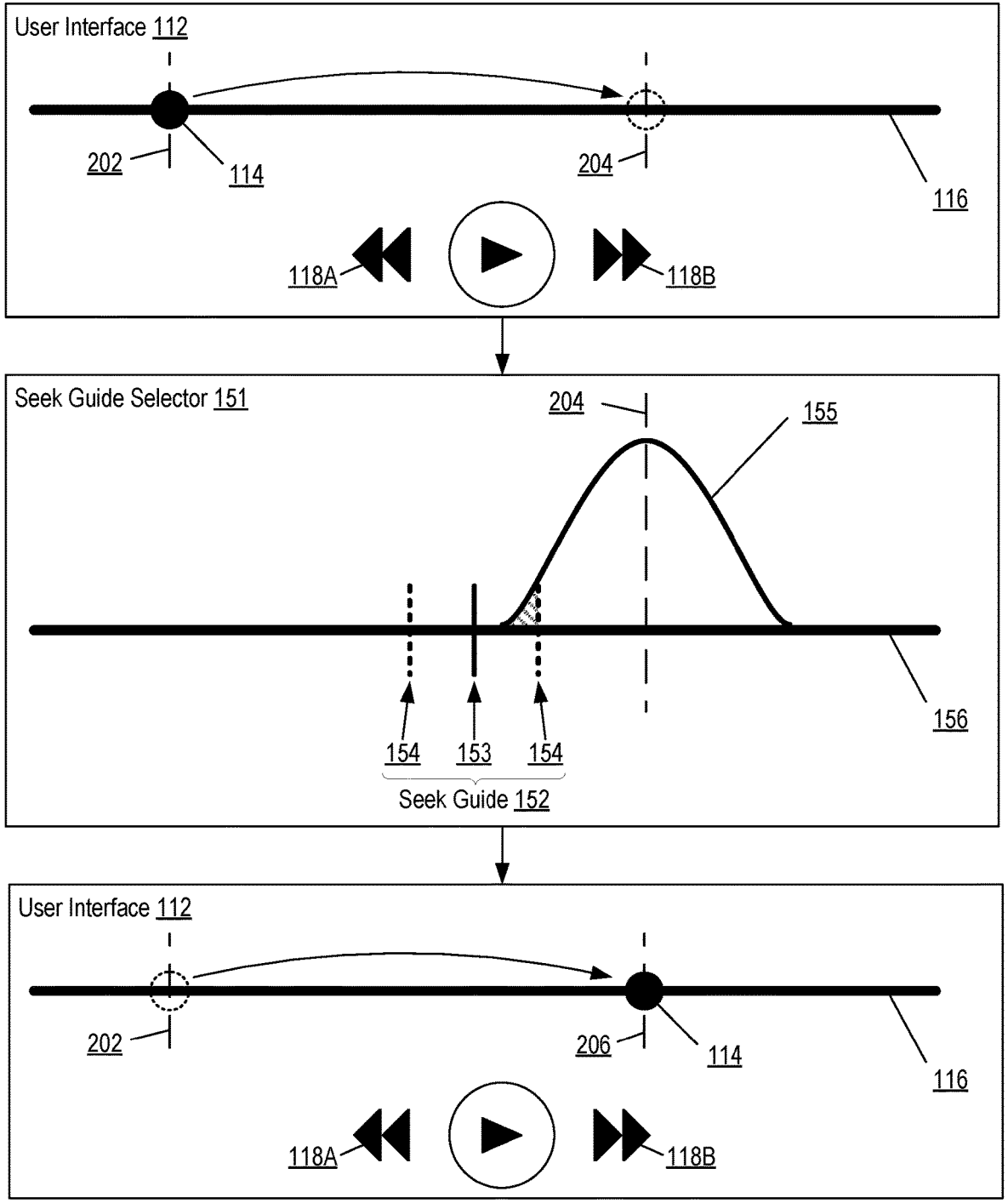
FIG. 10 illustrates a sixth example of skipping to a playback position using seek guides.

In alternative embodiments, such as the embodiment depicted in FIG. 10, the seek guide selector 151 may not select a seek guide 152 to use for setting the new playback position 206. The seek guide selector 151 may use a predetermined threshold when selecting a seek guide 152; a seek guide 152 may not be selected if the calculated probability is below the predetermined threshold.

In the embodiment, depicted in FIG. 10, the probabilistic distribution 155 may have a smaller standard deviation than in the previously illustrated embodiments of FIGS. 5-7. The seek guide 152 may thus have a smaller calculated probability when determining the calculated probability using the cumulative distribution function of the probabilistic distribution 155. The calculated probability may be lower than the predetermined threshold, so the seek guide selector 151 may not select the seek guide 152. For example, the predetermined threshold may be 0.2 and the seek guide 152 may have a calculated probability of 0.1. Because the seek guide selector 151 may not select a seek guide 152 to set the playback position, the seek guide selector 151 may set the playback position at the reference position 204. The user interface 112 may be updated by moving the position indicator 114 along the scrub bar 116 from the initial playback position 202 to the new playback position 206, which is the same as the reference position 204.

While the illustrated embodiments of FIGS. 5-10 show user fast-forwarding in the media content item by using the second position control 118B that sets a reference position 204 to the right of the initial playback position 202, the seek guide selector 151 works in a similar manner when the user rewinds by selecting the first position control 118A that sets a reference position 204 to the left of the initial playback position 202.

Figure 11:
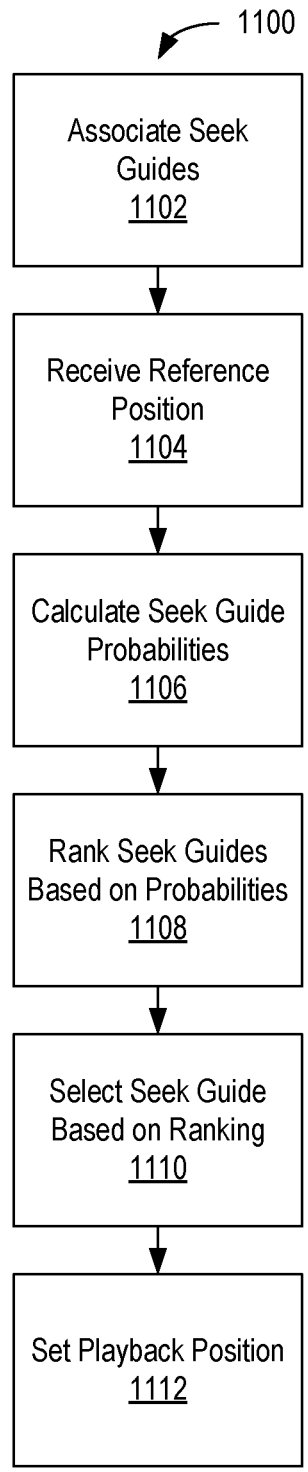
FIG. 11 illustrates a flowchart of an example method for skipping to a playback position using seek guides.

FIG. 11 illustrates an example flowchart of a method 1100 for snapping to seek positions in media content using seek guides. The method 1100 includes operations 1102, 1104, 1106, 1108, 1110, 1112.

The operation 1102 is performed to associate one or more seek guides with a media content item. As described above, each seek guide has a position and a radius. The positions of the seek guides may be at points of interest within the media content item. For example, seek guides may have positions at the beginning of words and sentences in a podcast or audiobook. In another example, seek guides may have positions at the beginning of verses in a media track. The radii may be based off the positions of the seek guides. For example, a seek guide with a position at the beginning of a sentence may have a larger radius than a seek guide with a position at the beginning of a word.

The positions and radii may be set manually, such as by an administrator of a media delivery system. Alternatively, the positions and radii may be set automatically. In an example, transcription data for the media content item may be used to automatically set the positions and radii of the seek guides. The transcription data may include a transcript or lyrics for the media content item and data mapping the transcript or lyrics to times in the media content item, such as forced alignment data. Using the transcription data, the positions and radii can automatically be set at the beginning of words and sentences. Rather than directly setting the radii for each seek guide, seek guides may instead be assigned to layers, and each layer may be assigned a radius so that each seek guide in a layer has the same radius. Seek guides may be assigned to layers manually or automatically, such as by using the transcription data.

The operation 1102 may be performed by a seek guide selector. The seek guide selector may set positions and radii for seek guides using transcription data for a media content item. The transcription data may come from media content metadata stored in a media data store in a media delivery system. The seek guide selector may maintain a list of the seek guides for a media content item. Alternatively, the seek guide selector may store the list of seek guides in the media data store, and the list of seek guides may be stored with other media content metadata.

The operation 1104 is performed to receive a reference position. The reference position may be set by a user skipping—i.e., fast forwarding or rewinding—in a media content item. The reference position may be a position to which the user is requesting to skip.

The operation 1104 may be performed by a seek guide selector receiving the reference position from a user computing device. The computing device may execute a media playback engine and may display a user interface with position controls. A user may select a position control to set a reference position a predetermined time away from an initial playback position. For example, selection of a position control may set the reference position 15 seconds after the initial playback position. After the reference position is set, the reference position may be transmitted from the computing device to the seek guide selector.

The operation 1106 is performed to calculate probabilities for at least one of the one or more seek guides associated with the media content item. The calculated probabilities may represent the probability that the position of the seek guide is the intended playback position to which the user wanted to seek. As described above, the probabilities may be calculated using a cumulative distribution function of a probabilistic distribution. The probabilistic distribution may be positioned based on the reference position received during the operation 1104, such as by having a mean at the reference position.

As described above, for which seek guides probabilities are calculated may be based on a direction to skip. For example, if the user requests to fast forward, probabilities may only be calculated for seek guides with a position that is after the initial playback position.

The operation 1106 may be performed by a seek guide selector using a probabilistic distribution that is a normal distribution with a mean at the reference position. In other examples, the seek guide selector may use other types of probabilistic distributions, such as skewed distributions, exponential distributions, and bimodal distributions. In further examples, the probabilistic distribution may be positioned differently, such as having a median or a mode at the reference position.

The operation 1108 is performed to rank the seek guides based on the probabilities. For example, the seek guides with a higher calculated probability may be ranked higher than a seek guide with a lower calculated probability. As described above, a direction to skip may also be considered when ranking the seek guides. For example, seek guides that have positions that do not align with the direction to skip may not be ranked or may be ranked lower than if only the probabilities were considered. The operation 1108 may be performed by a seek guide selector.

The operation 1110 is performed to select a seek guide. The seek guide may be selected based on the ranking from the operation 1108. For example, the seek guide with the highest ranking, and therefore the highest probability, may be selected. If multiple seek guides are tied in the ranking, tiebreakers may be used to select the seek guide. Examples of tiebreakers include selecting the seek guide with a position closest to the reference position, selecting the seek guide with the largest radius, selecting the seek guide with a position earliest in the media content item, and randomly selecting a seek guide. The operation 1110 may be performed by a seek guide selector.

The operation 1112 is performed to set a new playback position. The new playback position may be based on the position of the seek guide selected during the operation 1110, such as at the position of the seek guide.

The operation 1112 may be performed by a seek guide selector. The seek guide selector may cooperate with a media stream service and/or a media playback engine to set the new playback position. For example, the seek guide selector may send the position of the selected seek guide to the media stream service and/or media playback engine, and the media stream service and/or media playback engine may then set the new playback position and continue playback of the media content item from the new playback position. A user interface of a computing device executing the media playback engine may also be updated with the new playback position. A position indicator may be moved along a scrub bar to a position representing the new playback position.

Figure 12:
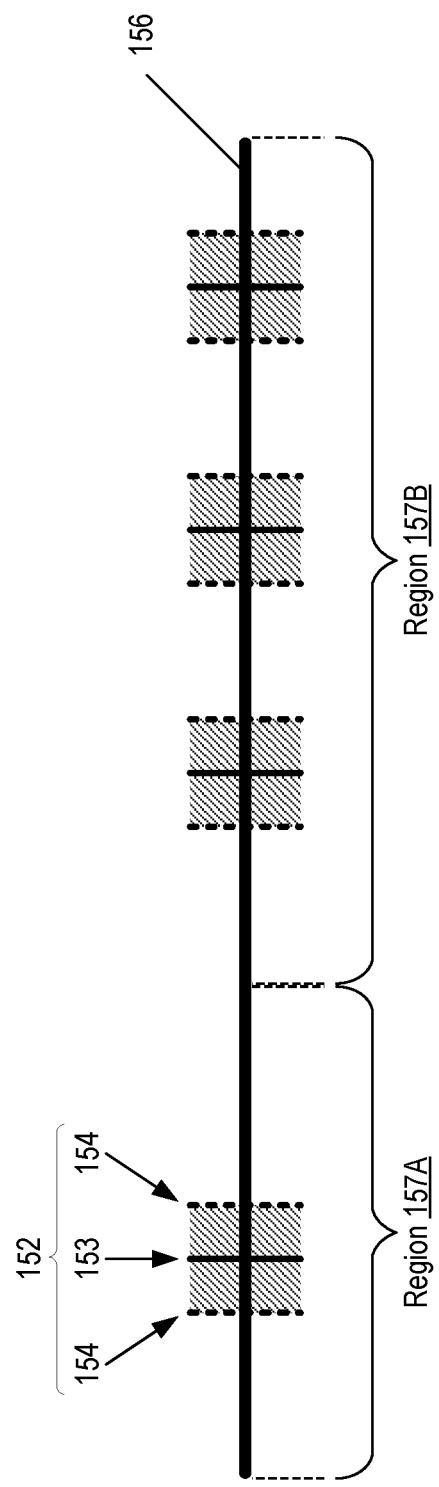
FIG. 12 illustrates an example of seek guides associated with a media content item with defined regions.

Turning to FIGS. 12-16, regions defined in media content items may also be used in determining a new playback position when skipping in some embodiments. FIG. 12 illustrates an example of a timeline 156 of a media content item with regions 157 defined. The regions 157 may be based on segments of the media content item. For example, if the media content item is a podcast, a first region 157A may define an introduction segment of the podcast, and a second region 157B may define a discussion segment of the podcast. In another example with podcasts, the first region 157A may define an advertisement or a sponsored segment, and the second region 157B may define a discussion segment of the podcast. In an example in which the media content item is an audiobook, the regions 157 may define chapters of the audiobook. In an example in which the media content item is a music track, the regions 157 may define segments of the music track, such as an introduction, verse, and chorus. The media content item may also have seek guides 152 associated with it.

Figure 13:
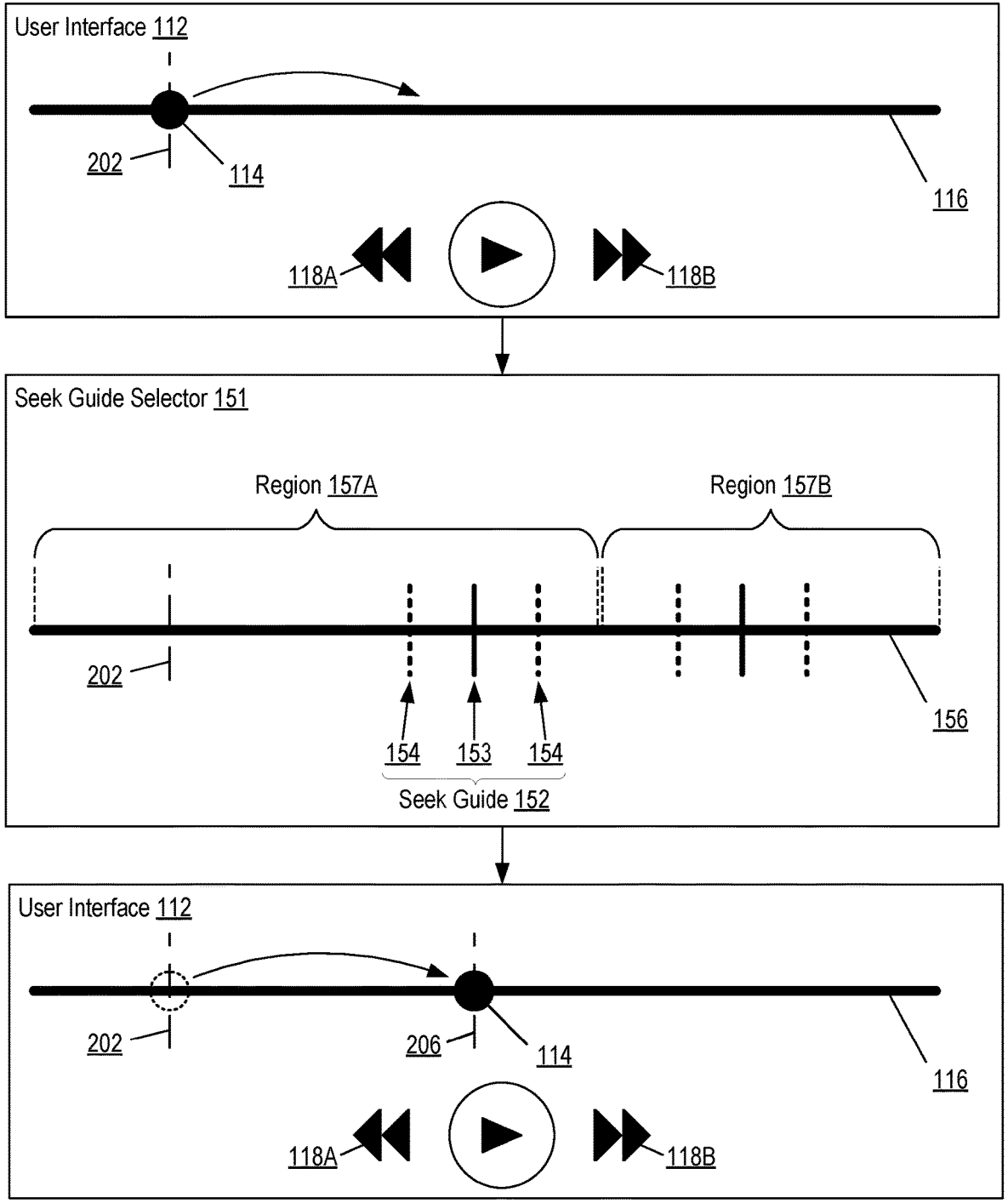
FIG. 13 illustrates an example of skipping to a playback position based on a defined region of a media playback item.
Figure 14:
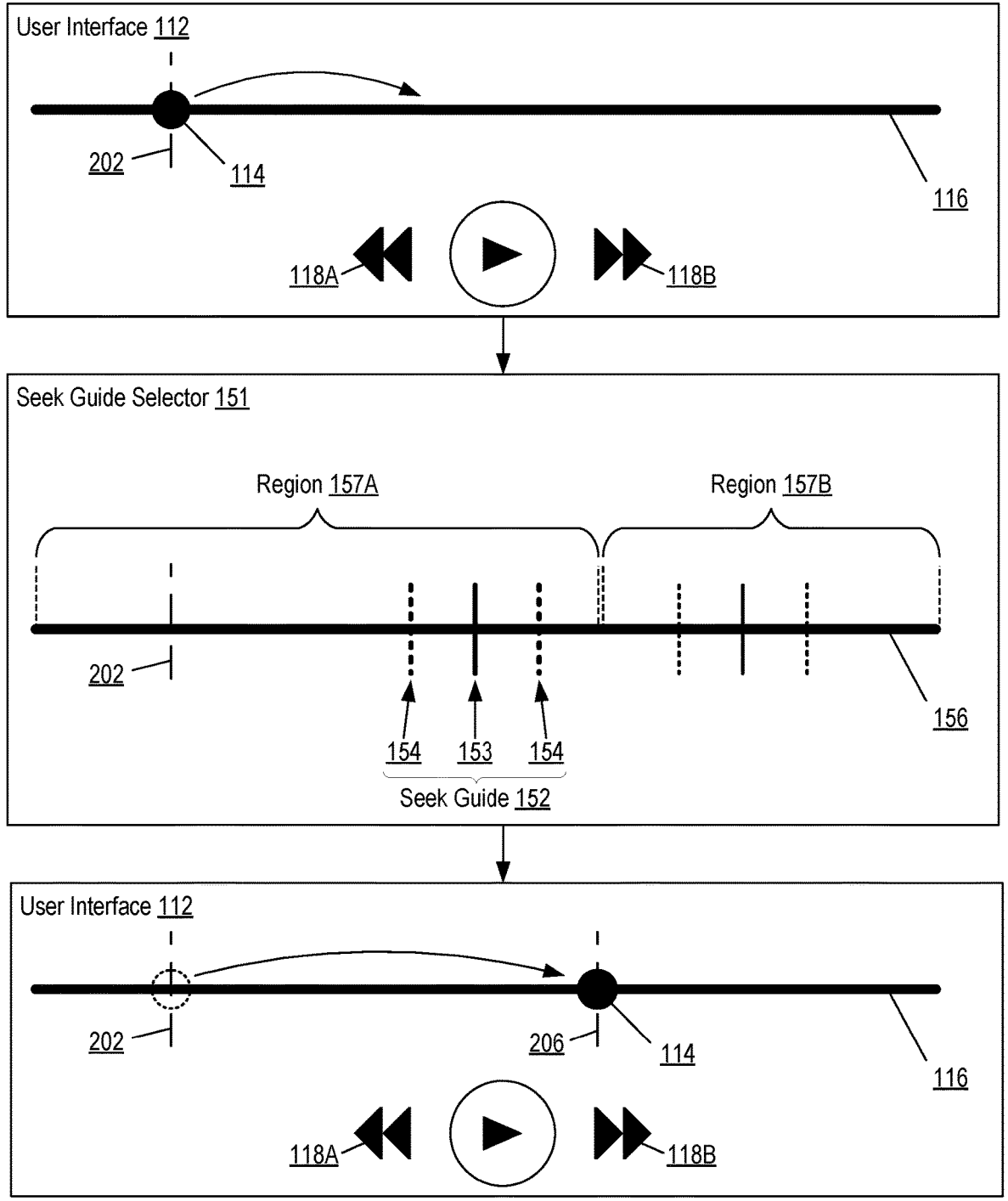
FIG. 14 illustrates a second example of skipping to a playback position based on a defined region of a media playback item.

FIGS. 13 and 14 illustrate examples of skipping to a playback position based on defined regions in a media content item. In these examples, an initial playback position 202 may be within a first region 157A of a media content item. When a user wishes to skip within the media content item, the user may use position controls 118 in a user interface 112. For example, the user may select a second position control 118B to fast forward.

Upon selection of the position control 118B, a request to skip may be sent to a seek guide selector 151. The request may also include a direction to skip, which in the illustrated examples is forwards. The seek guide selector 151 may determine in which region 157 the initial playback position 202 is. The seek guide selector 151 may take different actions to determine a new playback position 206 based on the region 157. In the illustrated examples, the initial playback position 202 is in a first region 157A. Because the initial playback position 202 is in the first region 157A, the seek guide selector 151 may determine the new playback position 206 without using a probabilistic distribution, as described above in relation to FIGS. 5-10. If the initial playback position 202 were in a second region 157B, the seek guide selector 151 may use a probabilistic distribution to select a seek guide 152 as described above.

In a first example, illustrated in FIG. 13, the seek guide selector 151 may select a seek guide 152 based on a distance and direction from the initial playback position 202 to the position 153 of the seek guide. In this example, the seek guide selector 151 may rank the seek guides 152 based on the distance and direction, and then may select the seek guide 152 based on the ranking. The seek guide selector 151 may select the seek guide 152 that has the position 153 that is the closest to the initial playback position 202 and is in the direction to skip. After the seek guide 152 has been selected, the new playback position 206 may be set based on the selected seek guide 152. As described above, the new playback position 206 may be set to the position 153 of the selected seek guide 152. In an alternative embodiment, the seek guide selector 151 may not rank the seek guides 152 and may instead advance from the initial playback position 202 in the direction to skip until it reaches a position 153 of a seek guide 152, and that seek guide 152 may be selected.

In some embodiments, the seek guide selector 151 may only select a seek guide 152 if the seek guide 152 has a position 153 within the same region 157 as the initial playback position 202—the first region 157A in the illustrated example. If there are no seek guides 152 with positions 153 in the region 157 with the initial playback position 202—or if there are no seek guides 152 in the direction to skip that have positions 153 in the region 157—the seek guide selector 151 may instead set the new playback position 206 at a beginning position or an end position of the region 157, depending on the direction to skip. In another example, the seek guide selector 151 may set the new playback position 206 to be a predetermined time away from the initial playback position 202 if there are no seek guides 152 in the direction to skip with positions 153 in the region 157 with the initial playback position 202. In alternative embodiments, the seek guide selector 151 may select the seek guide 152 with the closest position 153 to the initial playback position 202 and in the direction to skip regardless of in which region 157 the position 153 of the seek guide 152 is.

In a second example, illustrated in FIG. 14, the seek guide selector 151 may set the new playback position 206 to be at the beginning position or the end position of the region 157 of the initial playback position 202—the first region 157A in the illustrated embodiment. Whether the new playback position 206 is set at the beginning position or the end position of the region 157 may depend on the direction to skip: if the direction to skip is forward, the new playback position 206 may be set at the end position of the region 157, and if the direction to skip is backward, the new playback position may be set at the beginning position of the region 157. The seek guide selector 151 may set the new playback position 206 in this way regardless of whether there is a seek guide 152 in the region 157 with the initial playback position 202 or not.

Figure 15:
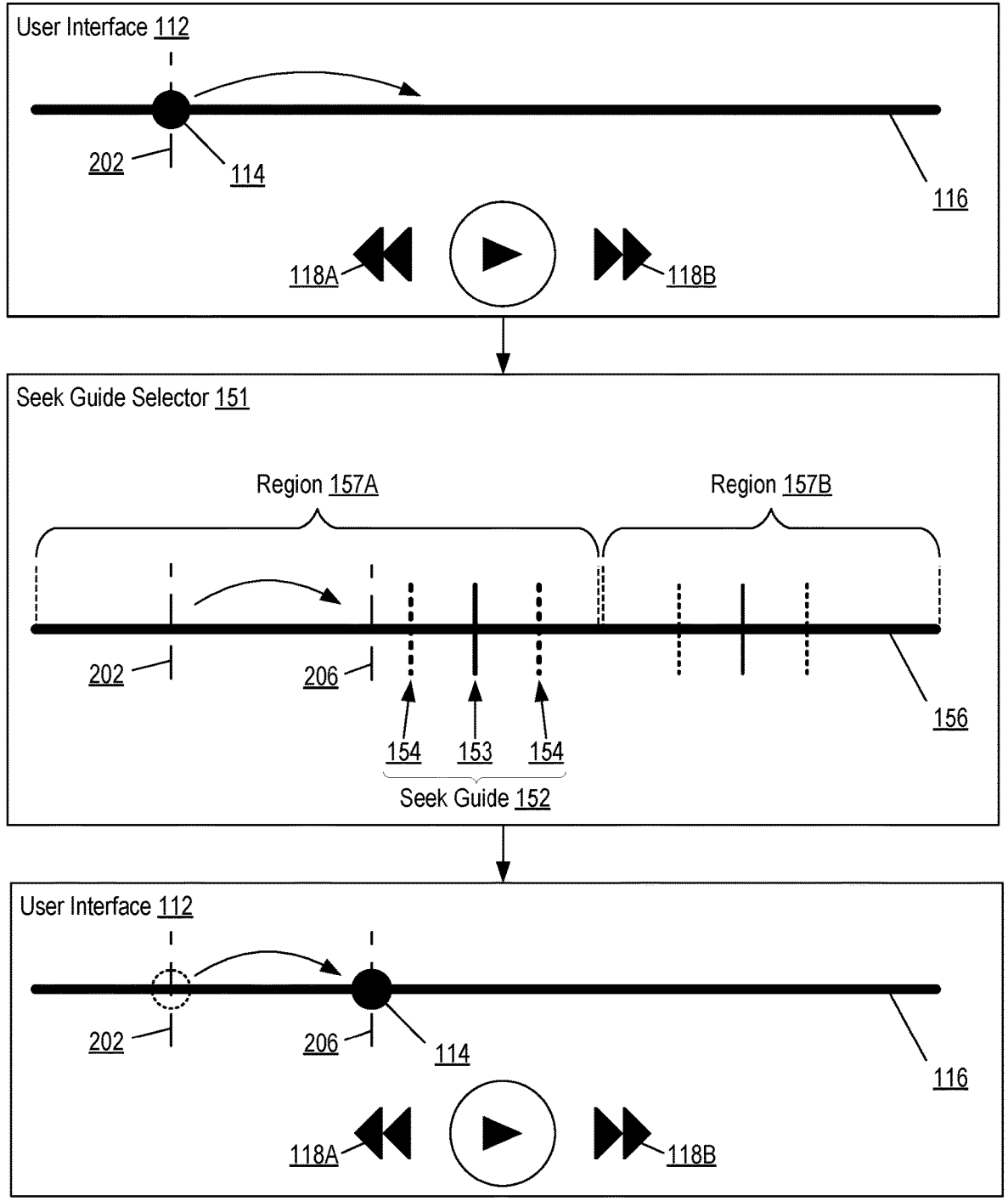
FIG. 15 illustrates a third example of skipping to a playback position based on a defined region of a media playback item.

In a third example, illustrated in FIG. 15, the seek guide selector 151 may set the new playback position 206 to be a predetermined time away from the initial playback position 202. The predetermined time may be the same amount of time as would be used to set a reference position like is previously described. The seek guide selector 151 may set the new playback position 206 in this way regardless of whether there is a seek guide 152 with a position 153 in the region 157 with the initial playback position 202 or not.

Once the new playback position 206 has been determined by the seek guide selector 151, the user interface 112 may be updated to move a position indicator 114 from the initial playback position 202 to the new playback position 206.

While the examples depicted in FIGS. 12-15 show two regions 157 defined for the media content item, in other embodiments, additional regions 157 may be defined for the media content item. In embodiments with more than two regions 157, the seek guide selector 151 may determine new playback positions 206 differently in each region 157, or the seek guide selector 151 may behave similarly in multiple regions 157.

Figure 16:
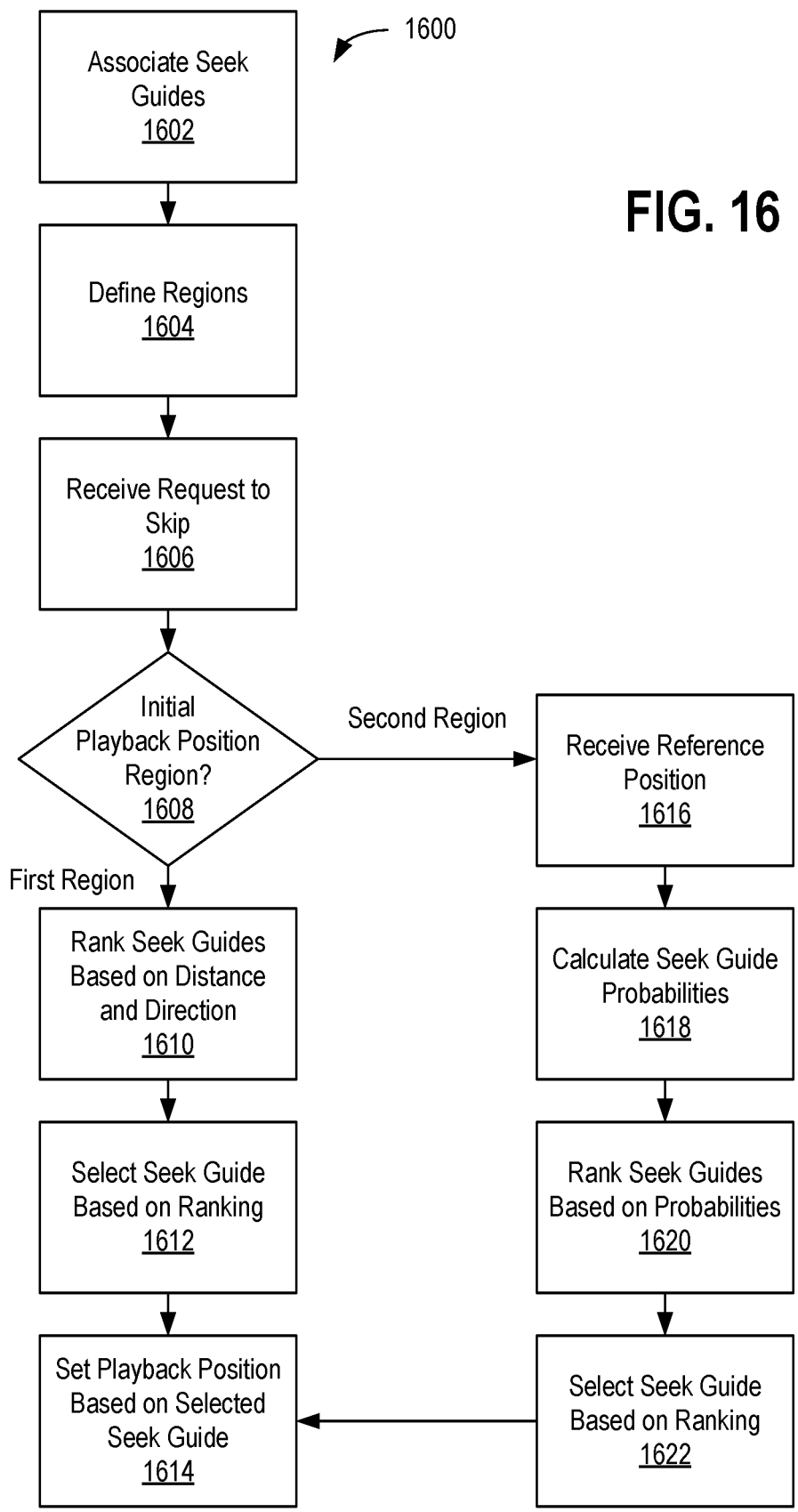
FIG. 16 illustrates a flowchart of an example method for skipping to a playback position in a media content item with defined regions.

FIG. 16 illustrates a flowchart of an example method 1600 for skipping to a playback position in a media content item with defined regions. The method 1600 includes operations 1602, 1604, 1606, 1608, 1610, 1612, 1614, 1616, 1618, 1620, 1622.

The operation 1602 is performed to associate seek guides with a media content item. The operation 1602 may be similar to the operation 1102 previously described with relation to FIG. 11. Additionally, as with the operation 1102, the operation 1602 may be performed by a seek guide selector, which may work with a media data store to store a list of seek guides for the media content item.

The operation 1604 is performed to define two or more regions in the media content item. The regions may be defined on a timeline of the media content item. The regions may define segments of the media content item. For example, if the media content item is a podcast, a first region may define an introduction segment of the podcast, and a second region may define a discussion segment of the podcast.

The operation 1604 may be performed by a seek guide selector. The seek guide selector may define two or more regions on a timeline for a media content item. Information on the regions may be maintained by the seek guide selector, or the seek guide selector may store the information in a media data store with other metadata on the media content item.

The operation 1606 is performed to receive a request to skip. The request to skip may include an initial playback position and a direction to skip. The operation 1606 may be performed by a seek guide selector. The seek guide selector may receive the request to skip from a computing device that is presenting a media content item to a user through a media playback engine. The user may select a position control on a user interface to request to skip—i.e., fast forward or rewind.

The operation 1608 is performed to determine in which region of the regions defined during the operation 1604 the initial playback position is. Different actions may be taken depending on the region that includes the initial playback position. In the illustrated method 1600, only two regions are considered. In alternative embodiments, additional regions may be considered. The operation 1608 may be performed by a seek guide selector.

If the initial playback position is in a first region, the method 1600 may advance to the operation 1610. The operation 1610 is performed to rank one or more seek guides based on a distance to the initial playback position and a direction from the initial playback position. In an example, a first seek guide with a position closer to the initial playback position may be ranked higher than a second seek guide with a position that is further away from the initial playback position. In an embodiment, only seek guides that have a position that aligns with the direction to skip may be ranked—i.e., if the direction to skip is forwards, seek guides that have positions that are before the initial playback position may not be ranked. The operation 1610 may be performed by a seek guide selector.

The operation 1612 is performed to select a seek guide based on the ranking from the operation 1610. The highest ranking seek guide may be selected. The operation 1612 may be performed by a seek guide selector.

The operation 1614 is performed to set a new playback position based on the selected seek guide. The new playback position may be positioned at substantially the position of the selected seek guide. In alternative embodiments, the new playback position may be positioned before the position of the selected seek guide—a few seconds before, for example. As with the operation 1112 described above with relation to FIG. 11, the operation 1614 may be performed by a seek guide selector, which may cooperate with a media stream service and/or a media playback engine to set the new playback position. Also like with the operation 1112, a user interface of a computing device executing the media playback engine may also be updated with the new playback position by moving a position indicator along a scrub bar to the new playback position.

If during the operation 1608 the initial playback position is determined to be in a second region, the method 1600 advances to the operation 1616 to receive a reference position and progresses through the operations 1618, 1620, 1622 to calculate seek guide probabilities, rank seek guides based on the calculated probabilities, and select a seek guide based on the ranking of operation 1620. The operations 1616, 1618, 1620, 1622 may be similar to the operations 1104 1106, 1108, 1110 described above with relation to FIG. 11 and may be performed by similar components, such as a seek guide selector. After the operation 1622, the method 1600 progresses to the operation 1614 to set the new playback position based on the selected seek guide as described above.

In alternative embodiments of the method 1600, additional or alternative operations may be performed. For example, if the initial playback position is determined to be in the first region during the operation 1608, rather than performing the operations 1610, 1612, 1614 to rank the seek guides based on the direction and distance the initial playback position, select a seek guide based on the ranking, and set the new playback position based on the selected seek guide, an operation may instead be performed to set the new playback position at one of a beginning or end position of the first region based on the direction to skip.

Additionally, in alternative embodiments, some operations may not be performed. For example, the operation 1610 may be skipped, and a seek guide may be selected during the operation 1612 by advancing from the initial playback position in the direction to skip until a position 153 of a seek guide 152 is reached, and that seek guide 152 may be selected.

Turning to FIGS. 17-28, new playback positions may be set in inactive media content items rather than active media content items in some embodiments. Active media content items may be a media content item that is being presented to a user. An inactive media content item may be a queued media content item (e.g., a media content item set to be presented after the active media content item) or a previous media content item (e.g., a media content item that was presented before the active media content item).

FIGS. 17-20 illustrate examples of setting a new playback position in a queued media content item. A user may be listening/watching an active media content item 132A. A user interface 112 may be presented to the user that includes a scrub bar 116A that represents a timeline 156A for the active media content item 132A. The user interface 112 may also include a position indicator 114 at an initial playback position 202. The user may request to skip by selecting position controls 118 of which a first position control 118A may allow the user to rewind and a second position control 118B may allow the user to fast forward. In the illustrated embodiments, the user may select the second position control 118B to fast forward.

After a position control 118 is selected, a reference position 204 may be set. In the embodiments depicted in FIGS. 17-19, the reference position 204 may be set in the queued media content item 132B. In the example illustrated in FIG. 20, the reference position 204 may be set in the active media content item 132A.

Figure 17:
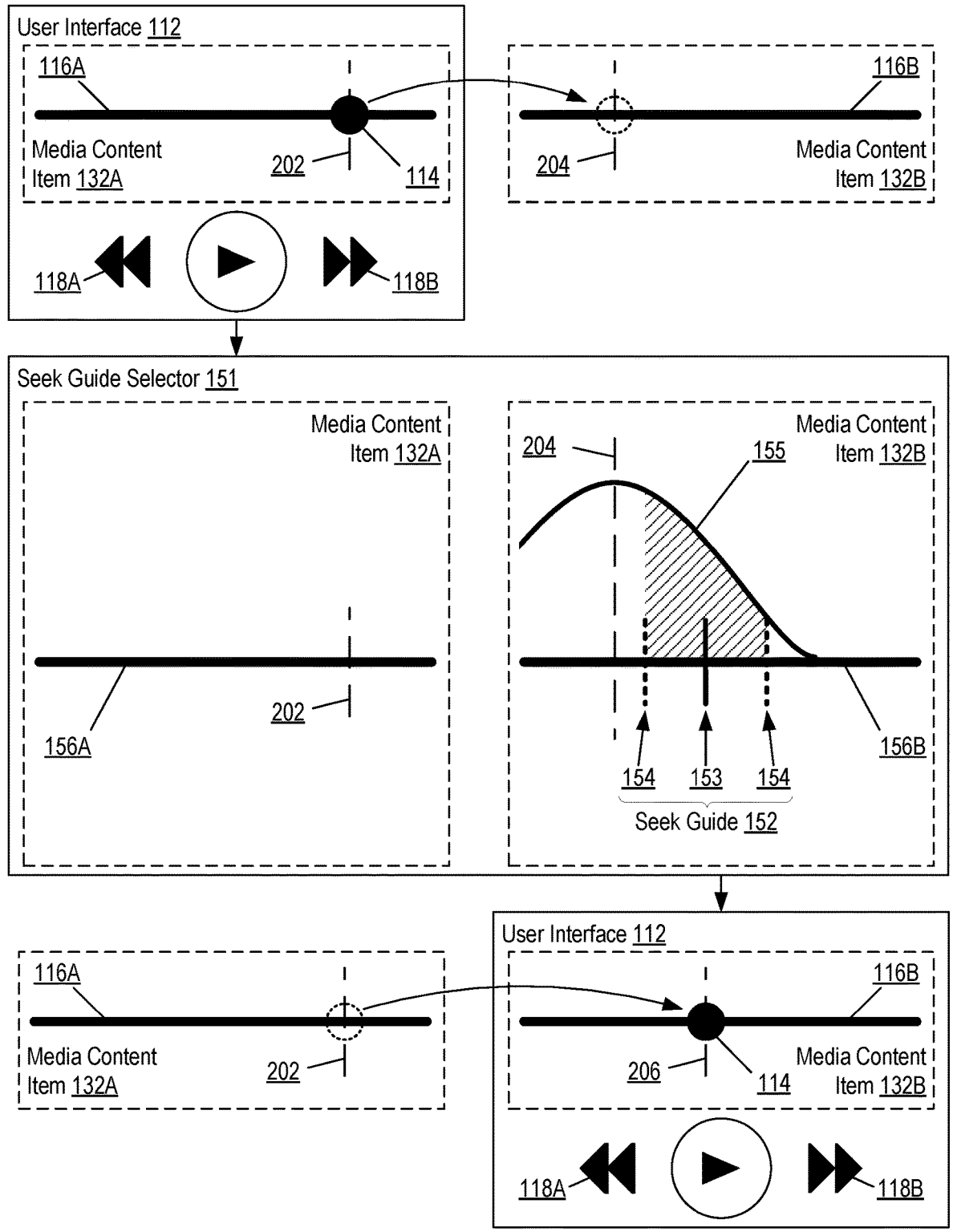
FIG. 17 illustrates an example of skipping to a playback position in a queued media content item using seek guides.

In the example shown in FIG. 17, the reference position 204 may be set at a position some amount of time into the queued media content item 132B. In an embodiment, the reference position 204 is a predetermined time away from the initial playback position 202 when considering both an amount of time remaining in the active media content item 132A and an amount of time before the reference position 204 in the queued media content item 132B. For example, if there are 10 seconds remaining in the active media content item 132A when the user requests to fast forward with the second position control 118B and the predetermined time is 15 seconds, the reference position 204 may be 5 seconds into the queued media content item 132B.

In an alternative embodiment, the reference position 204 may be set at a predetermined position within the queued media content item 132B (e.g., 10 seconds into the queued media content item 132B) if the initial playback position 202 is less than the predetermined time away from the end of the active media content item 132A. For example, if the initial playback position 202 is 10 seconds away from the end of the active media content item 132A and the predetermined time is 15 seconds, the reference position 202 may be set at a predetermined position 10 seconds into the queued media content item 132B. Similarly, if the initial playback position 202 is 2 seconds away from the end of the active media content item 132A and the predetermined time is 15 seconds, the reference position 202 may be set at a predetermined position 10 seconds into the queued media content item 132B. However, if the initial playback position is 20 seconds away from the end of the active media content 132A and the predetermined time is 15 seconds, the reference position 204 may be set in the active media content item 132A the predetermined time away from the initial playback position 202 like in the embodiments depicted in FIGS. 5, 7-10, and 20. In some embodiments, the reference position 204 may be set at the predetermined position in the queued media content item 132B regardless of the time between the initial playback position 202 and the end of the active media content item 132A.

Figure 18:
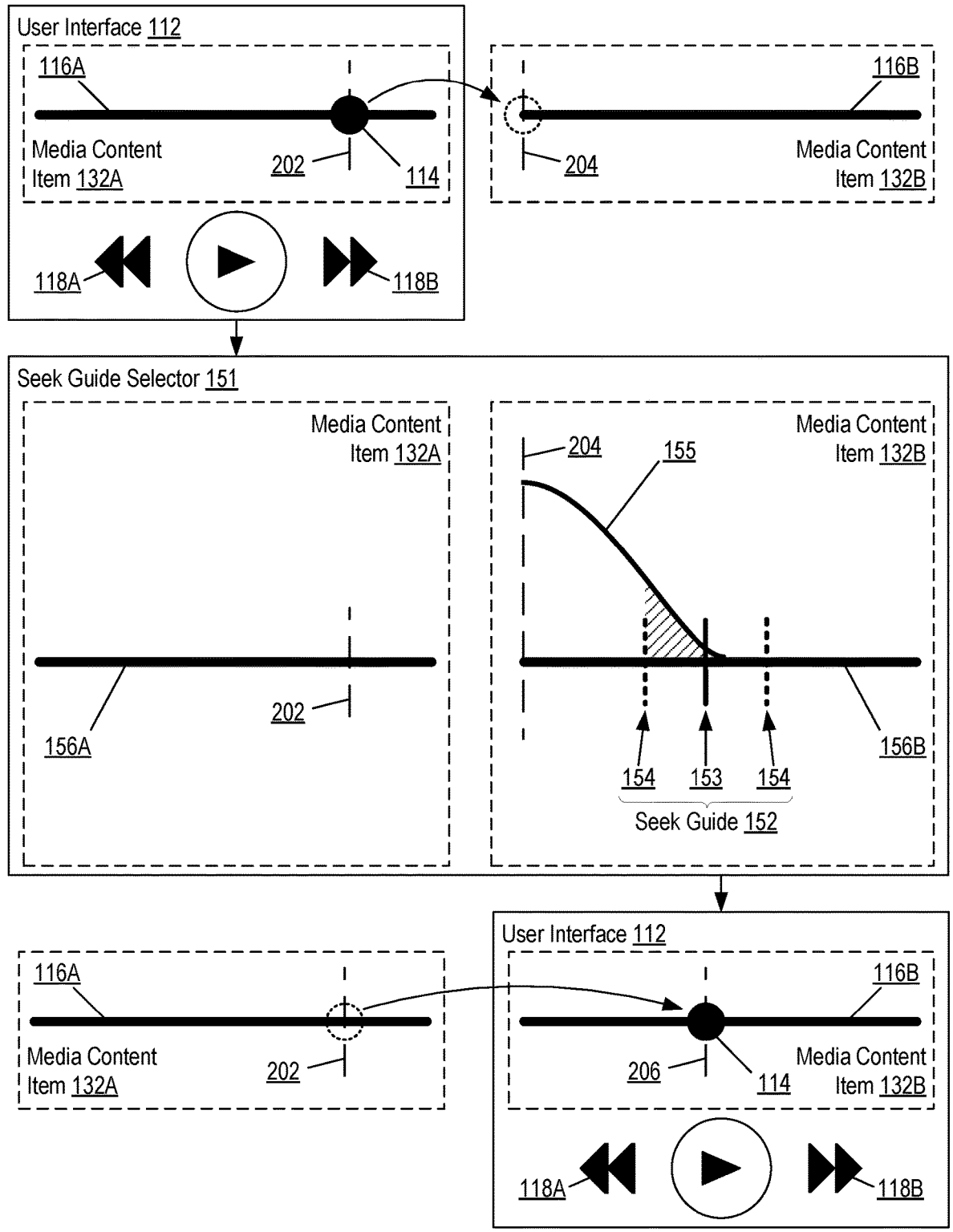
FIG. 18 illustrates a second example of skipping to a playback position in a queued media content item using seek guides.
Figure 19:
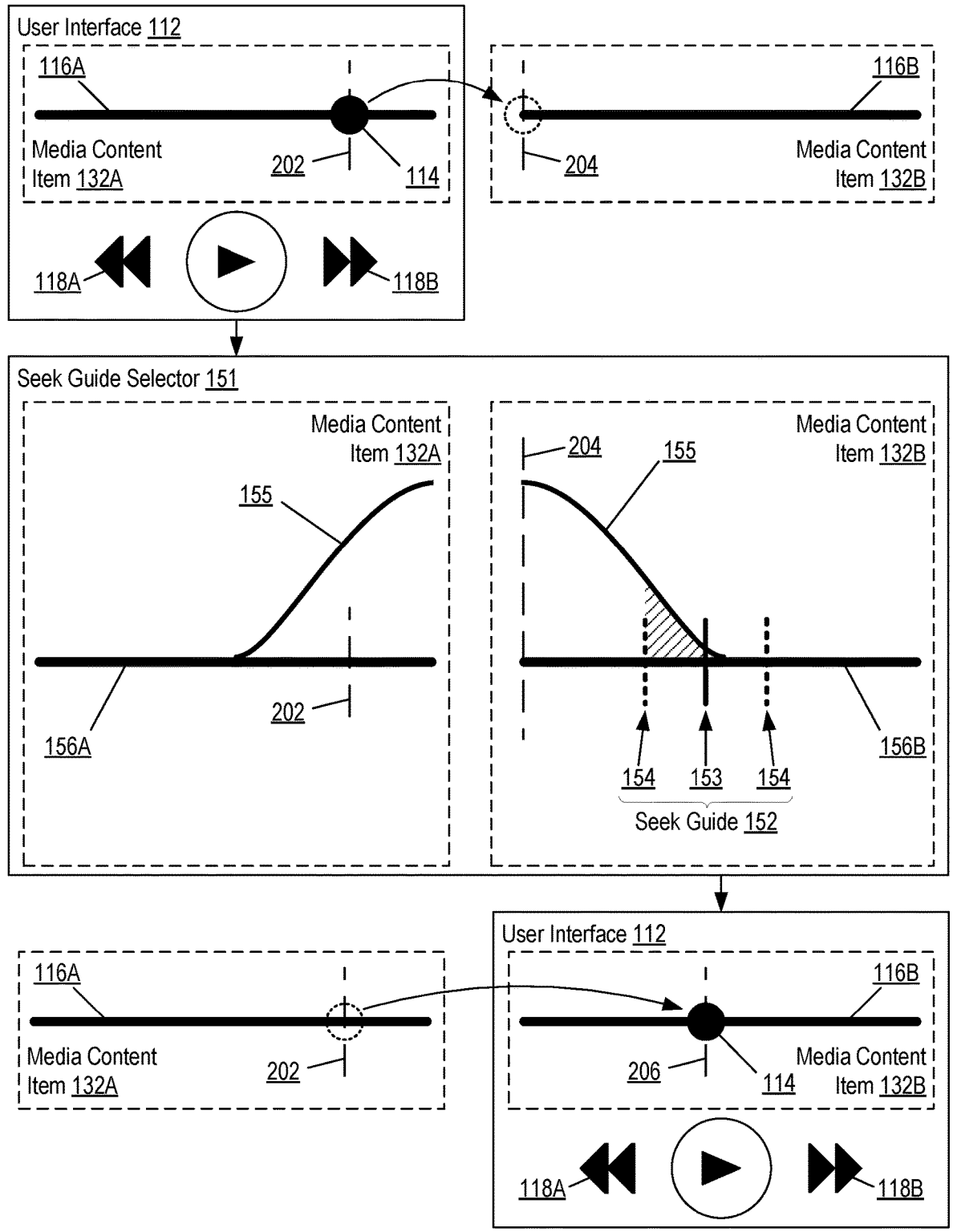
FIG. 19 illustrates a third example of skipping to a playback position in a queued media content item using seek guides.

In the examples shown in FIGS. 18 and 19, the reference position 204 may be set at the beginning of the queued media content item 132B. In some embodiments, the reference position 204 may be set at the beginning of the queued media content item if the initial playback position 202 is less than a predetermined time from the end of the active media content item. For example, if the initial playback position 202 is 10 seconds from the end of the active media content item 132A and the predetermined time is 15 seconds, the reference position may be set at the beginning of the queued media content item 132B. In those embodiments, if the initial playback position 202 is more than the predetermined time away from the end of the active media content item 132A, the reference position 204 may be set in the active media content item 132A, such as in the examples depicted in FIGS. 5, 7-10, and 20. In alternative embodiments, the reference position 204 may be set at the beginning of the queued media content item 132B regardless of where the initial playback position 202 is within the active media content item 132A.

Figure 20:
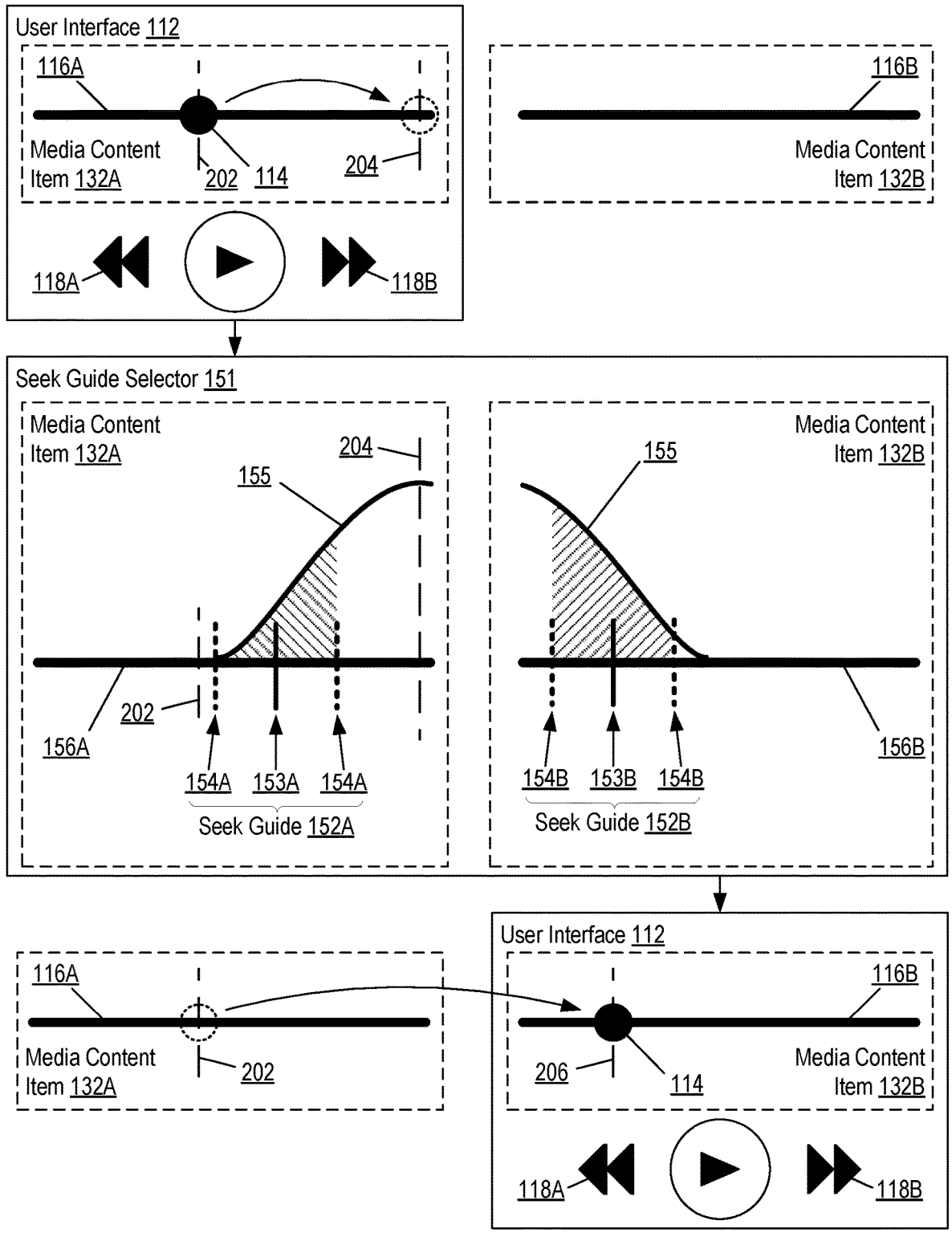
FIG. 20 illustrates a fourth example of skipping to a playback position in a queued media content item using seek guides.

In the example shown in FIG. 20, the reference position 204 may be set within the active media content item 132A. As described above, the reference position 204 may be set a predetermined time from the initial playback position 202—e.g., 15 seconds away.

After the reference position 204 is set, a seek guide selector 151 may use a probabilistic distribution 155 to select a seek guide 152, as described above. The probabilistic distribution 155 may be positioned based on the reference position 204, such as by having a mean at the reference position 204. In some embodiments, such as the embodiments shown in FIGS. 17 and 18, the probabilistic distribution 155 may only cover a timeline 156B for the queued media content item 132B. In such embodiments, the seek guide selector 151 may only consider seek guides 152 in the queued media content item 132B.

In alternative embodiments, such as the embodiments shown in FIGS. 19 and 20, the probabilistic distribution 155 may cover both the timeline 156B for the queued media content item 132B and a timeline 156A for the active media content item 132A. In such embodiments, the seek guide selector 151 may consider seek guides 152 from both the queued media content item 132B and the active media content item 132A. For example, when the reference position 204 is at the beginning of the queued media content item 132B, such as in FIG. 19, the seek guide selector 151 may treat the probabilistic distribution 151 as having a mean at the beginning of the queued media content item 132B when considering seek guides 152 associated with the queued media content item 132B, and the seek guide selector 151 may treat the probabilistic distribution 151 as having a mean at the end of the active media content item 132A when considering seek guides 152 associated with the active media content item 132A. In another example, when the reference position 204 is 5 seconds into the queued media content item 132B, the seek guide selector 151 may treat the probabilistic distribution 155 as having a mean 5 seconds into the queued media content item 132B when considering seek guides 152 associated with the queued media content item 132B, and the seek guide selector 151 may treat the probabilistic distribution 155 as having a mean 5 seconds after the end of the active media content item 132A when considering seek guides 132A associated with the active media content item 132A.

As previously described, the seek guide selector 151 may use the probabilistic distribution 155 to calculate probabilities for seek guides 152, such as by using a cumulative distribution function. The seek guide selector 151 may rank the seek guides 152 based on the calculated probabilities and select a seek guide 152 based on the ranking. After a seek guide 152 is selected, a new playback position 206 may be set based on a position 153 of the selected seek guide 152. In some embodiments, the seek guide selector 151 may consider a predetermined threshold when selecting a seek guide 152, and if no seek guides 152 have a calculated probability greater than or equal to the predetermined threshold, the new playback position 206 may instead be set at the reference position 204.

The user interface 112 may be updated based on the new playback position 206. In the illustrated embodiments, because the new playback position 206 is within the queued media content item 132B, the user interface 112 may display a scrub bar 116B representing the timeline 156B of the queued media content item 132B. The position indicator 114 may be set at the new playback position 206, and playback of the queued media content item 132B may begin from the new playback position 206.

FIGS. 21-28 illustrate examples of setting a new playback position in a previous media content item. As with previous examples, a user may be listening/watching an active media content item 132A. A user interface 112 may be presented to the user that includes a scrub bar 116A that represents a timeline 156A for the active media content item 132A and a position indicator 114 at an initial playback position 202. The user may request to skip by selecting a first position control 118A to rewind.

A reference position 204 may be set after selection of the first position control 118A. In some embodiments, such as those depicted in FIGS. 21-23 and 25-27, the reference position 204 may be set in a previous media content item 132B. In other embodiments, such as those depicted in FIGS. 24 and 28, the reference position 204 may be set in the active media content item 132A.

Figure 21:
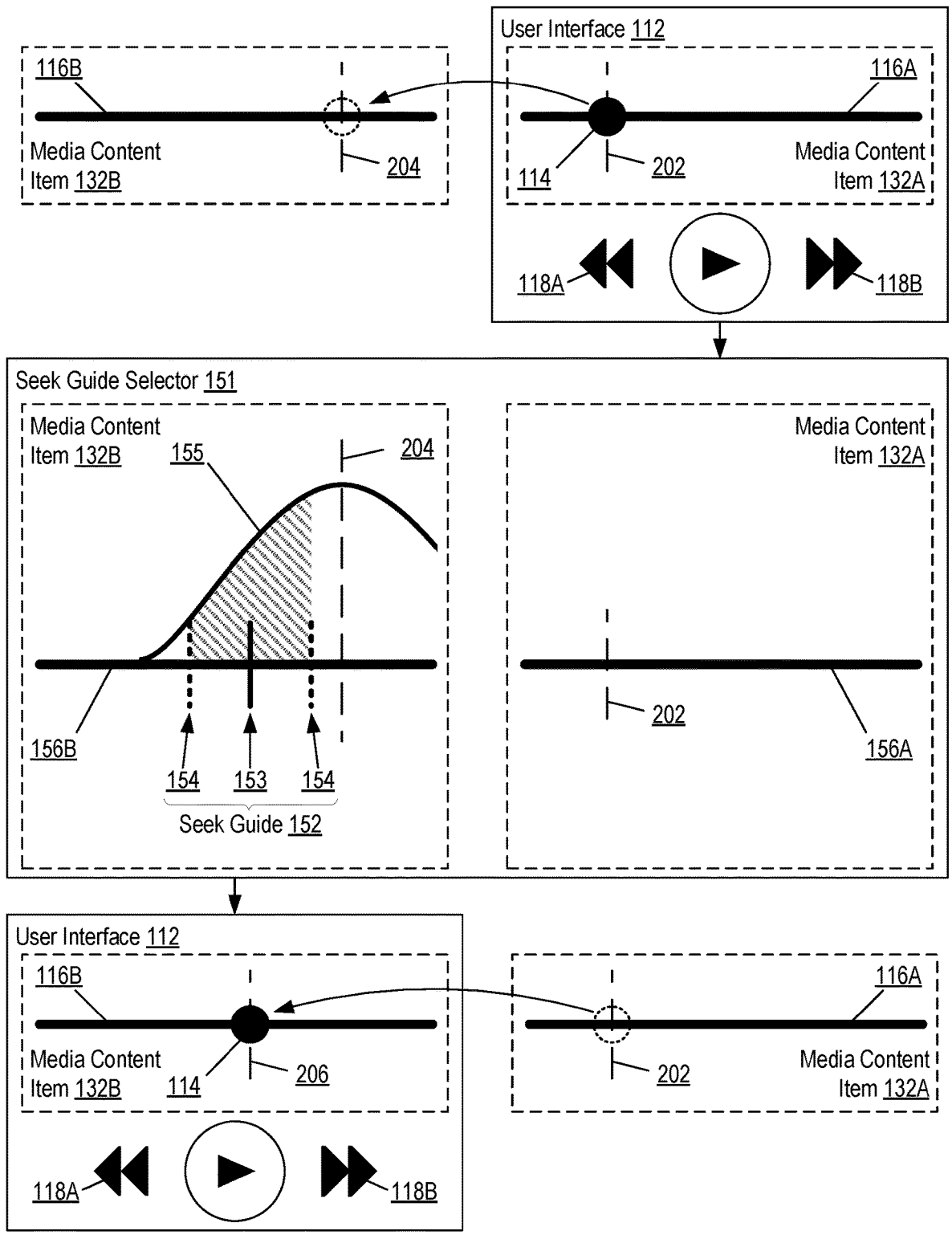
FIG. 21 illustrates an example of skipping to a playback position in a previous media content item using seek guides.
Figure 22:
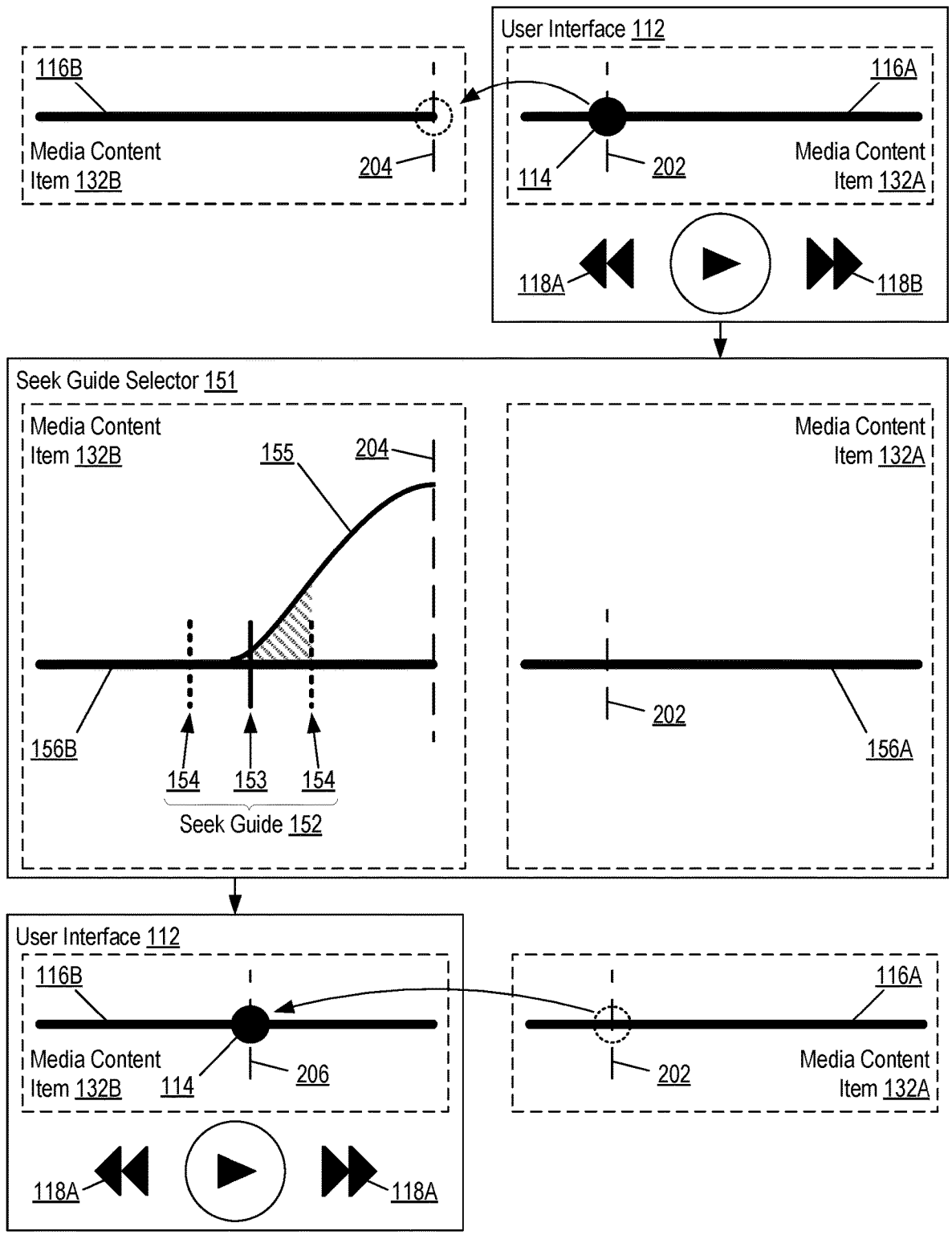
FIG. 22 illustrates a second example of skipping to a playback position in a previous media content item using seek guides.
Figure 23:
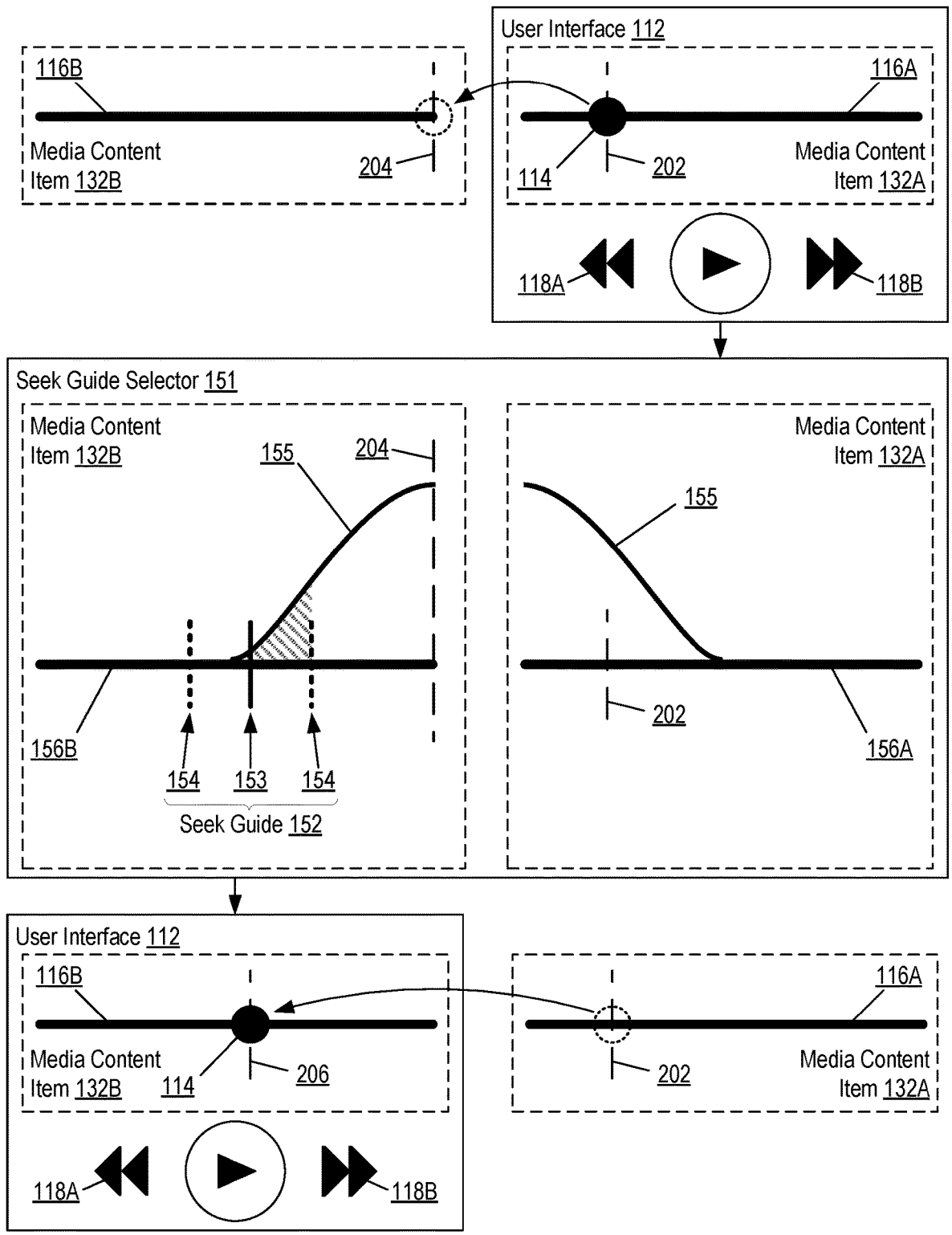
FIG. 23 illustrates a third example of skipping to a playback position in a previous media content item using seek guides.
Figure 25:
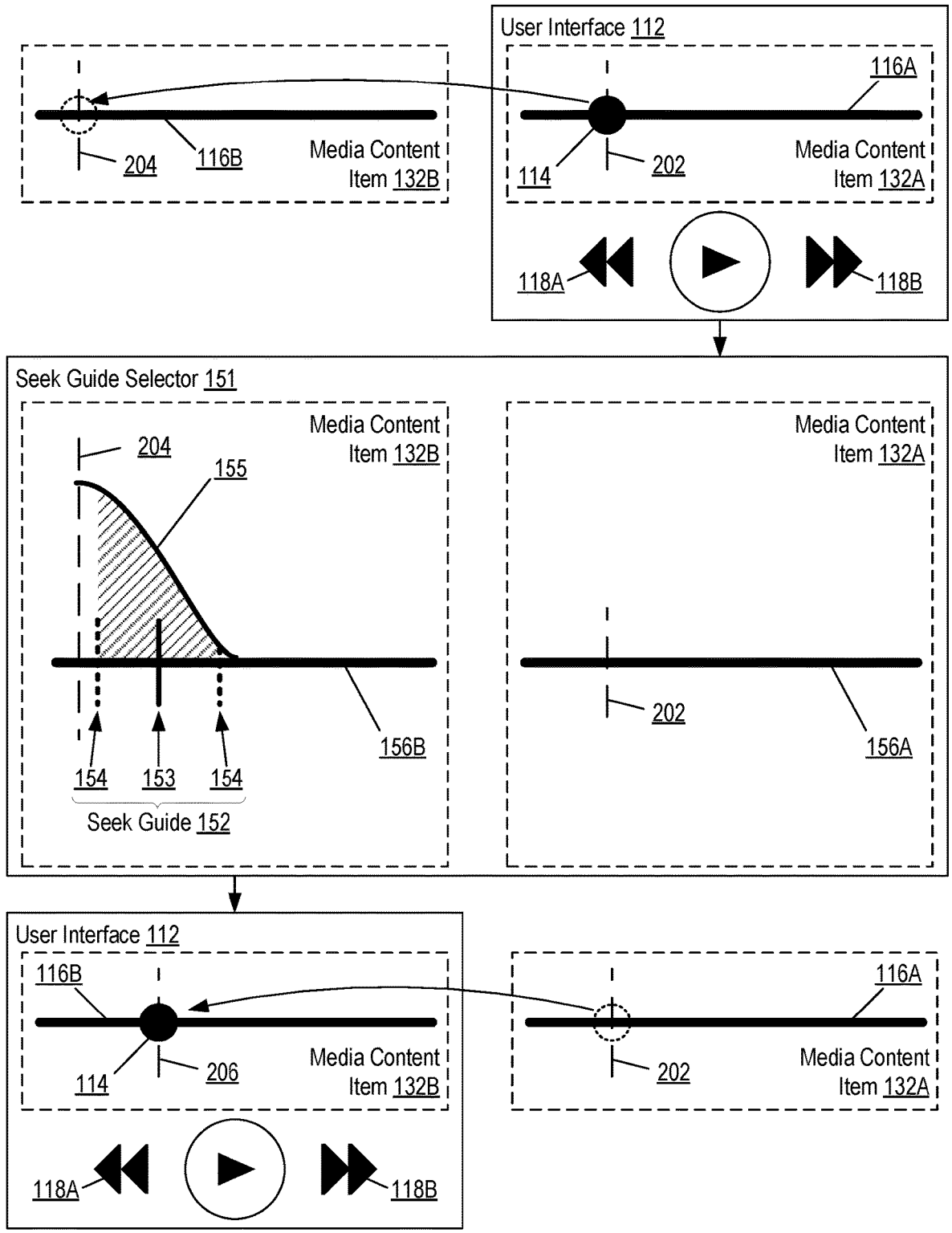
FIG. 25 illustrates a fifth example of skipping to a playback position in a previous media content item using seek guides.
Figure 26:
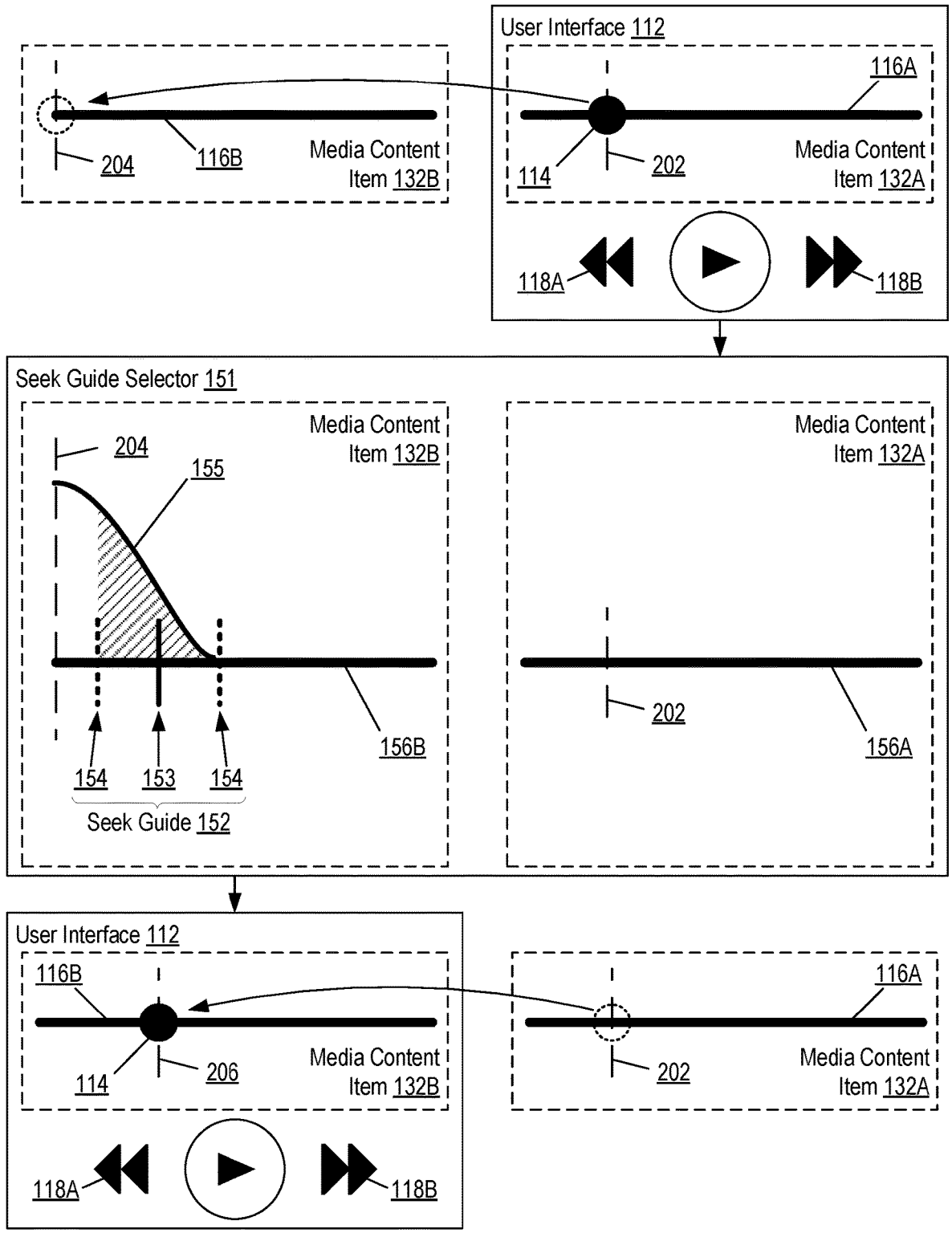
FIG. 26 illustrates a sixth example of skipping to a playback position in a previous media content item using seek guides.
Figure 27:
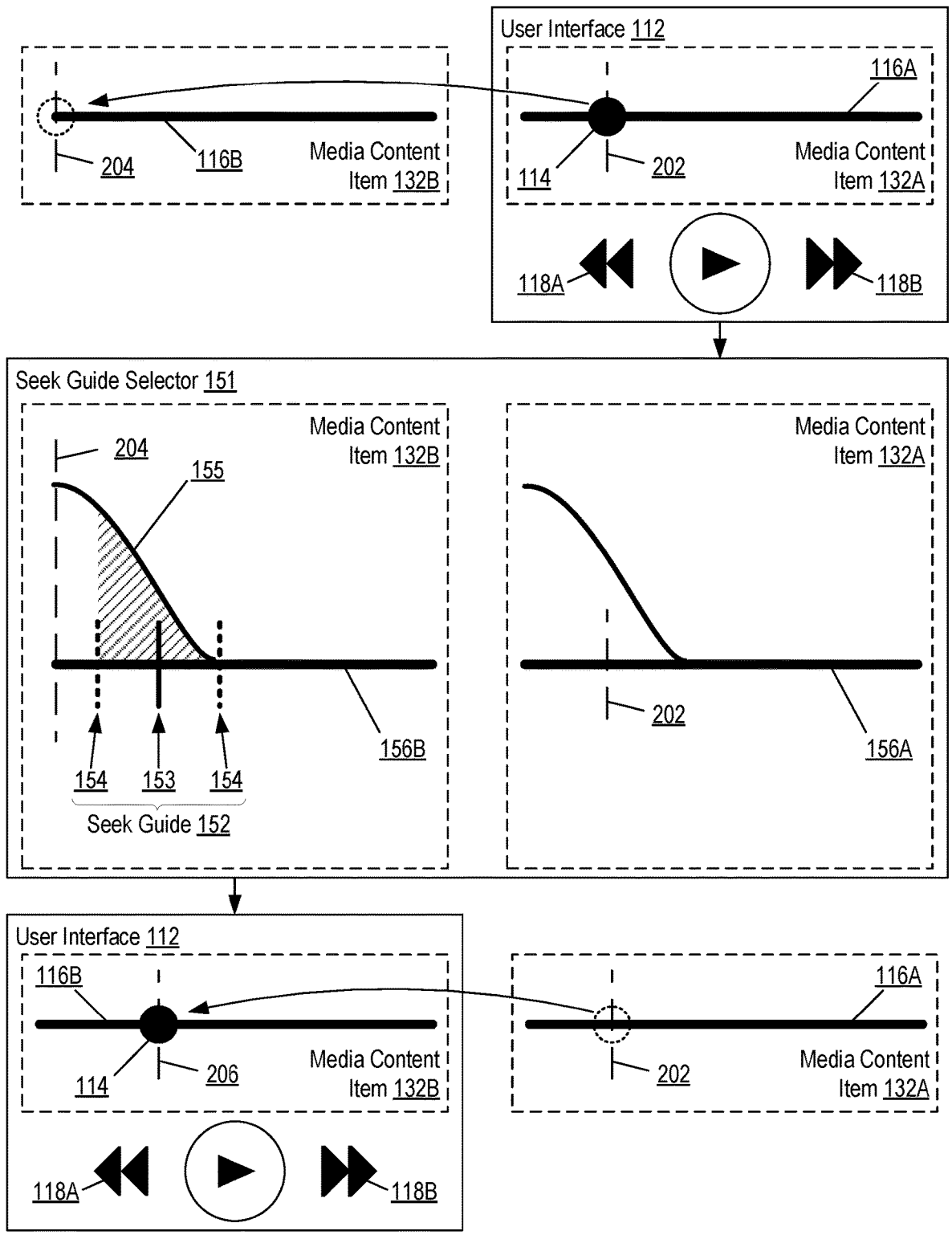
FIG. 27 illustrates a seventh example of skipping to a playback position in a previous media content item using seek guides.

In the examples shown in FIGS. 21 and 25, the reference position 204 may be set at a position some amount of time into the previous media content item 132B. In the embodiment shown in FIG. 21, the reference position 204 is set at a distance from the end of the previous media content item 132B. In the embodiment shown in FIG. 25, the reference position is set a distance from the beginning of the previous media content item 132B. In an embodiment, the reference position 204 is a predetermined time away from the initial playback position 202 when considering both an amount of time between the initial playback position 202 and the beginning of the active media content item 132A and amount of time between the reference position 204 and the beginning/end of the queued media content item 132B. For example, if the initial playback position 202 is 10 seconds into the active media content item 132A when the user requests to rewind with the second position control 118B and the predetermined time is 15 seconds, the reference position 204 may be 5 seconds from the beginning/end of the queued media content item 132B.

In an alternative embodiment, the reference position 204 may be set at a predetermined position within the previous media content item 132B (e.g., 10 seconds from the beginning/end of the media content item 132B) if the initial playback position 202 is less than the predetermined time away from the beginning of the active media content item 132A. For example, if the initial playback position 202 is 10 seconds away from the beginning of the active media content item 132A and the predetermined time is 15 seconds, the reference position 202 may be set at a predetermined position 10 seconds from the beginning/end of the queued media content item 132B. Similarly, if the initial playback position 202 is 2 seconds away from the beginning of the active media content item 132A and the predetermined time is 15 seconds, the reference position 202 may be set at a predetermined position 10 seconds from the beginning/end of the queued media content item 132B. However, if the initial playback position is 20 seconds away from the beginning of the active media content item 132A and the predetermined time is 15 seconds, the reference position 204 may be set in the active media content item 132A the predetermined time away from the initial playback position 202 like in the embodiments depicted in FIGS. 5, 7-10, 24, and 28. In some embodiments, the reference position 204 may be set at the predetermined position in the queued media content item 132B regardless of the time between the initial playback position 202 and the beginning of the active media content item 132A.

The reference position 204 may alternatively be set at the beginning or the end of the previous media content item 132B. In the examples shown in FIGS. 22 and 23, the reference position 204 may be set at the end of the previous media content item 132B. In the examples shown in FIGS. 26 and 27, the reference position 204 may be set at the beginning of the media content item 132B. In some embodiments, the reference position 204 may be set at the beginning/end of the previous media content item if the initial playback position 202 is less than a predetermined time from the beginning of the active media content item. For example, if the initial playback position 202 is 10 seconds from the beginning of the active media content item 132A and the predetermined time is 15 seconds, the reference position may be set at the beginning/end of the previous media content item 132B. In those embodiments, if the initial playback position 202 is more than the predetermined time away from the beginning of the active media content item 132A, the reference position 204 may be set in the active media content item 132A, such as in the examples depicted in FIGS. 5, 7-10, 24, and 28. In alternative embodiments, the reference position 204 may be set at the beginning/end of the previous media content item 132B regardless of where the initial playback position 202 is within the active media content item 132A.

Figure 24:
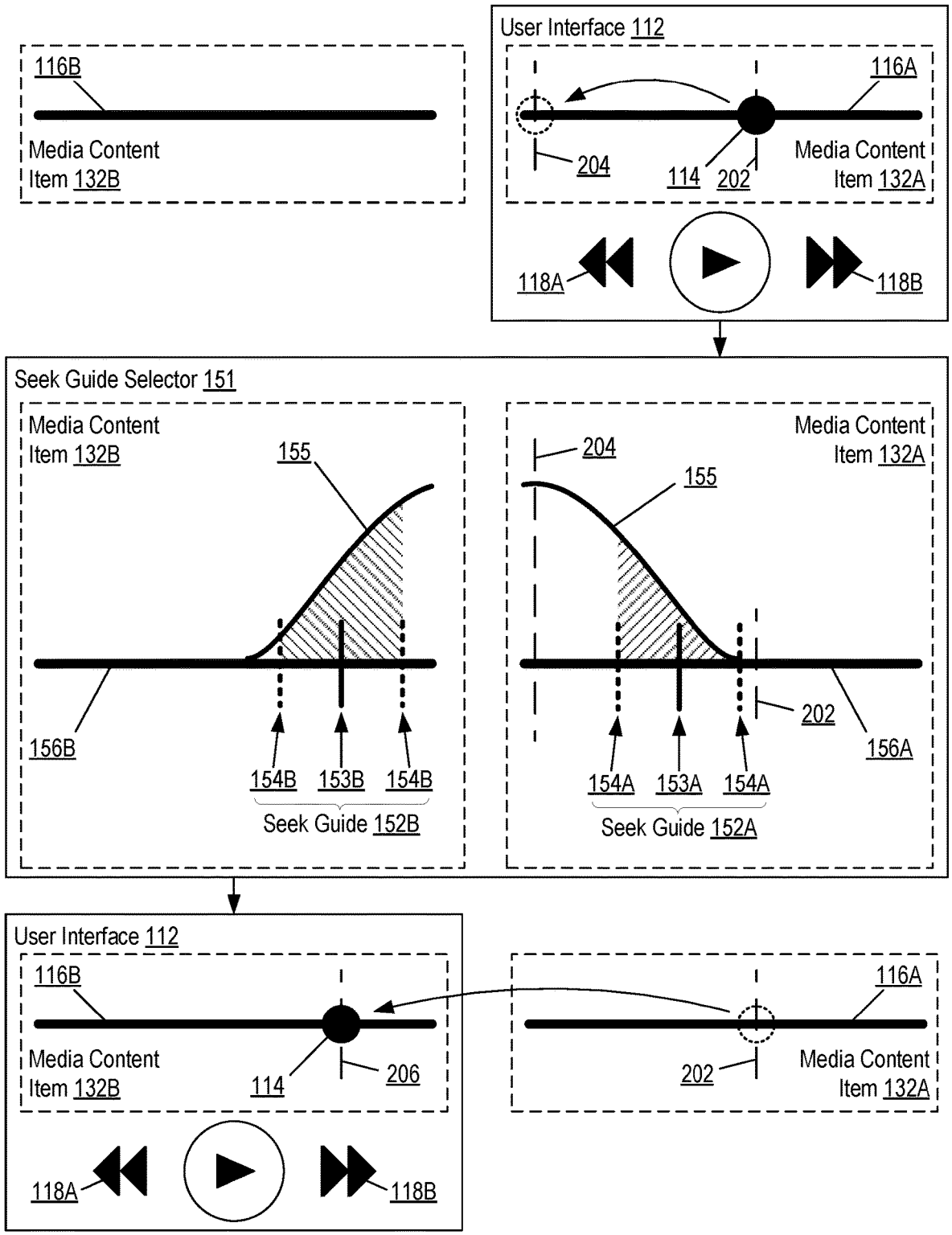
FIG. 24 illustrates a fourth example of skipping to a playback position in a previous media content item using seek guides.
Figure 28:
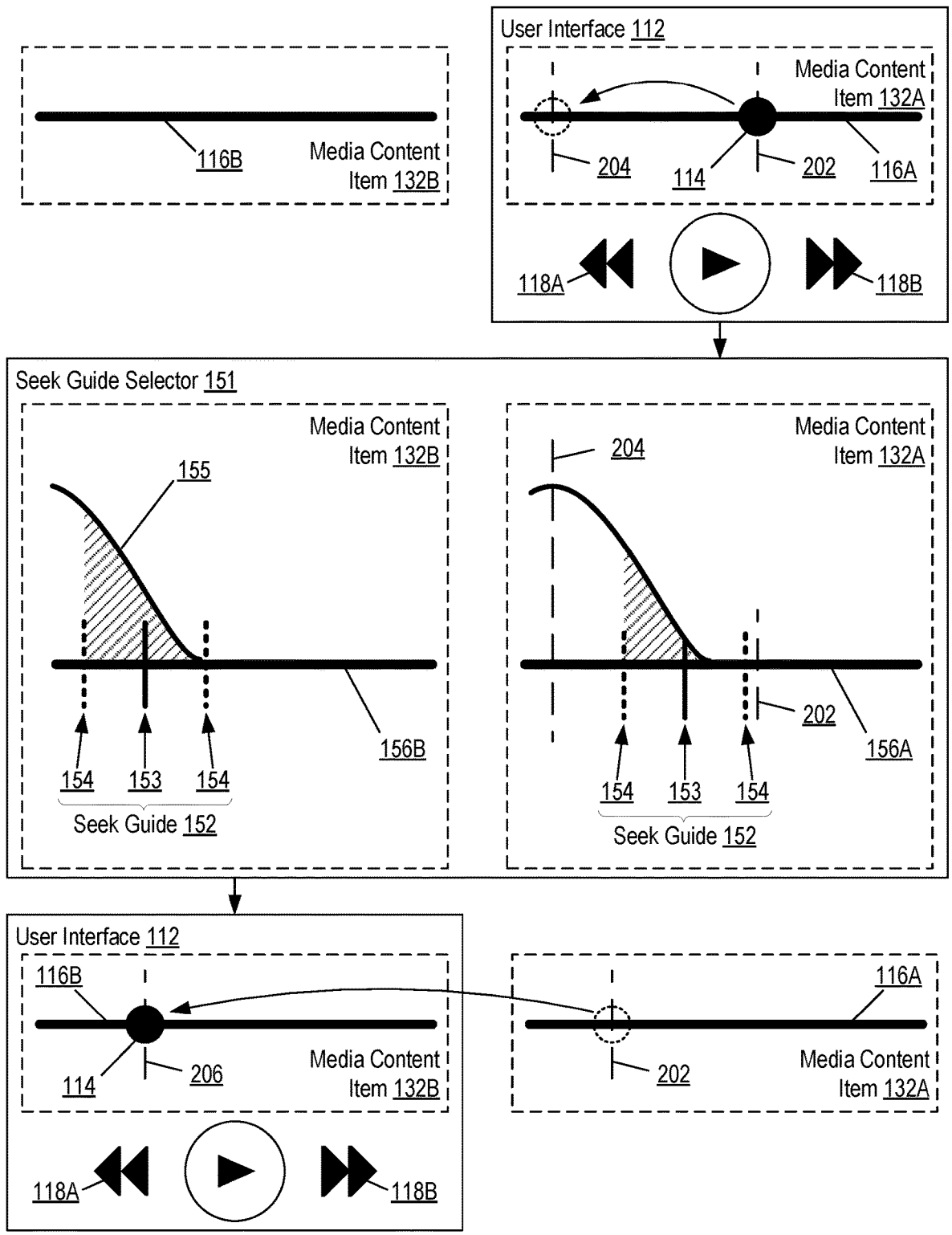
FIG. 28 illustrates an eighth example of skipping to a playback position in a previous media content item using seek guides.

In the examples shown in FIGS. 24 and 28, the reference position may be set within the active media content item 132A. As described above, the reference position 204 may be set a predetermined time from the initial playback position 202—e.g., 15 seconds away.

As previously described, a seek guide selector 151 may use the reference position 204 and a probabilistic distribution to select a seek guide 152. Like with the examples shown in FIGS. 17-20 for setting a new playback position in a queued media content item, the probabilistic distribution 155 may cover only a timeline 156B for the previous media content item 132B, or the probabilistic distribution may cover both the timeline 156B for the previous media content item 132B and a timeline 156A for the active media content item 132A. Thus, in some embodiments, the seek guide selector 151 may consider seek guides 152 from the previous media content item 132B, and in other embodiments, the seek guide selector 151 may consider seek guides in both the previous media content item 132B and the active media content item 132A. For example, if the reference position 204 is 5 seconds into the previous media content item 132B (either from the beginning or the end of the previous media content item 132B), the seek guide selector 151 may treat the probabilistic distribution 155 as having a mean 5 seconds into the previous media content item 132B (either from the beginning or the end, depending on the reference position 204) when considering seek guides 152 associated with the previous media content item 132B, and the seek guide selector 151 may treat the probabilistic distribution as having a mean 5 seconds before the beginning of the active media content item 132A when considering seek guides 152 associated with the active media content item 132A.

The seek guide selector 151 may use the probabilistic distribution 155 to calculate probabilities for one or more seek guides 152 and may rank the seek guides 152 based on the calculated probabilities. The seek guide selector 151 may then select a seek guide 152 based on the ranking to use in setting a new playback position 206. The new playback position 206 may be a position 153 of the selected seek guide 152, for example. As previously described, the seek guide selector 151 may consider a predetermined threshold when selecting a seek guide 152 and may only select a seek guide 152 with a calculated probability greater than or equal to the predetermined threshold. If no seek guides 152 have a calculated probability that satisfies the predetermined threshold, the seek guide selector 151 may set the new playback position at the reference position 204.

The user interface 112 may be updated based on the new playback position 206. In the illustrated embodiments, because the new playback position 206 is within the previous media content item 132B, the user interface 112 may display a scrub bar 116B representing the timeline 156B of the previous media content item 132B. The position indicator 114 may be set at the new playback position 206, and playback of the previous media content item 132B may begin from the new playback position 206.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method for determining skip positions in media content items, the method comprising:
 associating one or more seek guides with a media content item, each of the one or more seek guides including a position;
 defining two or more regions within the media content item;
 receiving a request from a user to skip within the media content item, the request including a direction to skip; and
 setting a new playback position based on an initial playback position and the two or more regions, wherein when the initial playback position is within a first region of the two or more regions, the new playback position is set by:
  calculating a probability for at least one of the one or more seek guides using a probabilistic distribution positioned based on a reference position, wherein the reference position is a predetermined time away from the initial playback position in the direction to skip;
  ranking the at least one of the one or more seek guides based on the calculated probabilities;
  selecting a seek guide from the one or more seek guides based on the ranking; and setting the new playback position based on the position of the selected seek guide.

2. The method of claim 1, wherein each of the one or more seek guides further includes a radius.

3. The method of claim 2, wherein the probability for a seek guide is calculated using a cumulative distribution function based on the position and the radius of the seek guide.

4. The method of claim 1, wherein the new playback position is the position of the selected seek guide.

5. The method of claim 1, wherein the selected seek guide has a highest calculated probability from among the calculated probabilities.

6. The method of claim 1, wherein setting the new playback position based on the position of the selected seek guide includes:
comparing the probability of a highest ranked seek guide to a predetermined threshold; and
when the probability of the highest ranked seek guide is greater than or equal to the predetermined threshold, setting the new playback position based on the position of the highest ranked seek guide, or
when the probability of the highest ranked seek guide is less than the predetermined threshold, setting the new playback position at the reference position.

7. The method of claim 1, wherein the probabilistic distribution is a normal distribution.

8. The method of claim 1, wherein the probabilistic distribution has a mean at the reference position.

9. A system for determining skip positions in media content items, the system comprising:
one or more processors; and
one or more computer-readable storage devices storing data instructions that, when executed by the one or more processors, cause the system to:
associate one or more seek guides with a media content item, each of the one or more seek guides including a position;
define two or more regions within the media content item;
receive a request from a user to skip within the media content item, the request including a direction to skip; and
set a new playback position based on an initial playback position and the two or more regions,
wherein when the initial playback position is within a first region of the two or more regions, to set a new playback position includes to:
calculate a probability for at least one of the one or more seek guides using a probabilistic distribution positioned based on a reference position, wherein the reference position is a predetermined time away from the initial playback position in the direction to skip;
rank the at least one of the one or more seek guides based on the calculated probabilities;
select a seek guide from the one or more seek guides based on the ranking; and
set the new playback position based on the position of the selected seek guide.

10. The system of claim 9, wherein when the initial playback position is within a second region of the two or more regions, to set a new playback position includes to:
select a seek guide based on a distance between the initial playback position and the position of the seek guide and a direction from the initial playback position to the position of the seek guide; and
set the new playback position based on the position of the selected seek guide.

11. The system of claim 9, wherein when the initial playback position is within a second region of the two or more regions, to set a new playback position includes to:
set the new playback position based on the direction to skip;
wherein when the direction to skip is forwards, the new playback position is set at an end position of the second region; and
wherein when the direction to skip is backwards, the new playback position is set at a beginning position of the second region.

12. The system of claim 9, wherein selection of the selected seek guide is further based on the direction to skip.

13. The system of claim 9, wherein the each of the one or more seek guides further includes a radius.

14. The system of claim 13, wherein each radius is based on a layer to which the seek guide is assigned.

15. A non-transitory computer-readable medium having stored thereon data instructions that, when executed by one or more processors, cause the one or more processors to:
associate one or more seek guides with a media content item, each of the one or more seek guides including a position;
define two or more regions within the media content item;
receive a request from a user to skip within the media content item, the request including a direction to skip; and
set a new playback position based on an initial playback position and the two or more regions,
wherein when the initial playback position is within a first region of the two or more regions, to set a new playback position includes to:
calculate a probability for at least one of the one or more seek guides using a probabilistic distribution positioned based on a reference position, wherein the reference position is a predetermined time away from the initial playback position in the direction to skip;
rank the at least one of the one or more seek guides based on the calculated probabilities;
select a seek guide from the one or more seek guides based on the ranking; and
set the new playback position based on the position of the selected seek guide.

16. The non-transitory computer-readable medium of claim 15, wherein when the initial playback position is within a second region of the two or more regions, to set a new playback position includes to:
select a seek guide based on a distance between the initial playback position and the position of the seek guide and a direction from the initial playback position to the position of the seek guide; and
set the new playback position based on the position of the selected seek guide.

17. The non-transitory computer-readable medium of claim 15, wherein when the initial playback position is within a second region of the two or more regions, to set a new playback position includes to:
set the new playback position based on the direction to skip;
wherein when the direction to skip is forwards, the new playback position is set at an end position of the second region; and wherein when the direction to skip is backwards, the new playback position is set at a beginning position of the second region.

18. The non-transitory computer-readable medium of claim 15, wherein selection of the selected seek guide is further based on the direction to skip.

19. The non-transitory computer-readable medium of claim 15, wherein the each of the one or more seek guides further includes a radius.

20. The non-transitory computer-readable medium of claim 19, wherein each radius is based on a layer to which the seek guide is assigned.

* * * * *